Sept. 13, 1932.        W. B. FAGEOL        1,877,653
MOTOR VEHICLE AND METHOD OF CONSTRUCTING THE SAME
Filed April 17, 1929        22 Sheets-Sheet 1
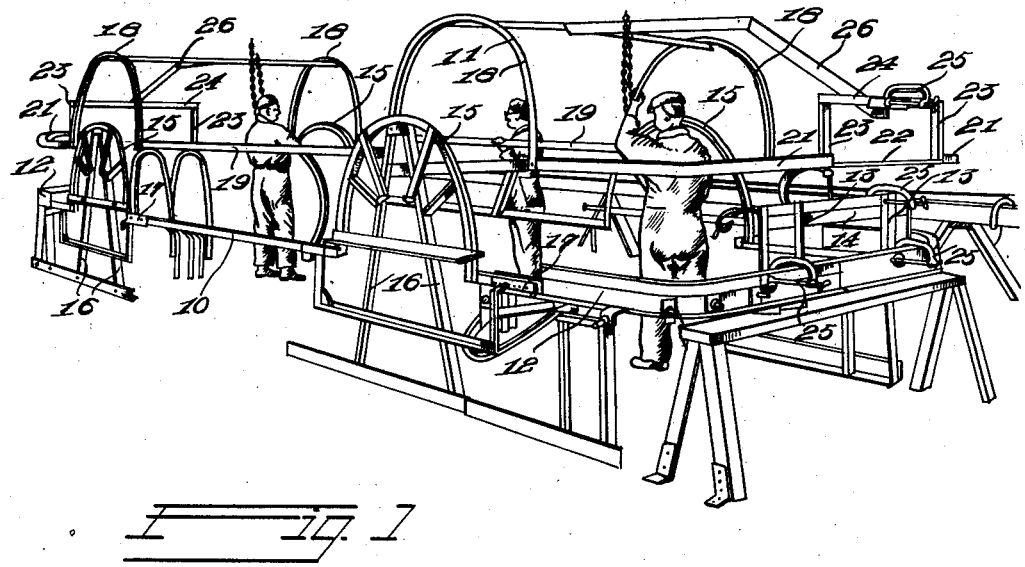

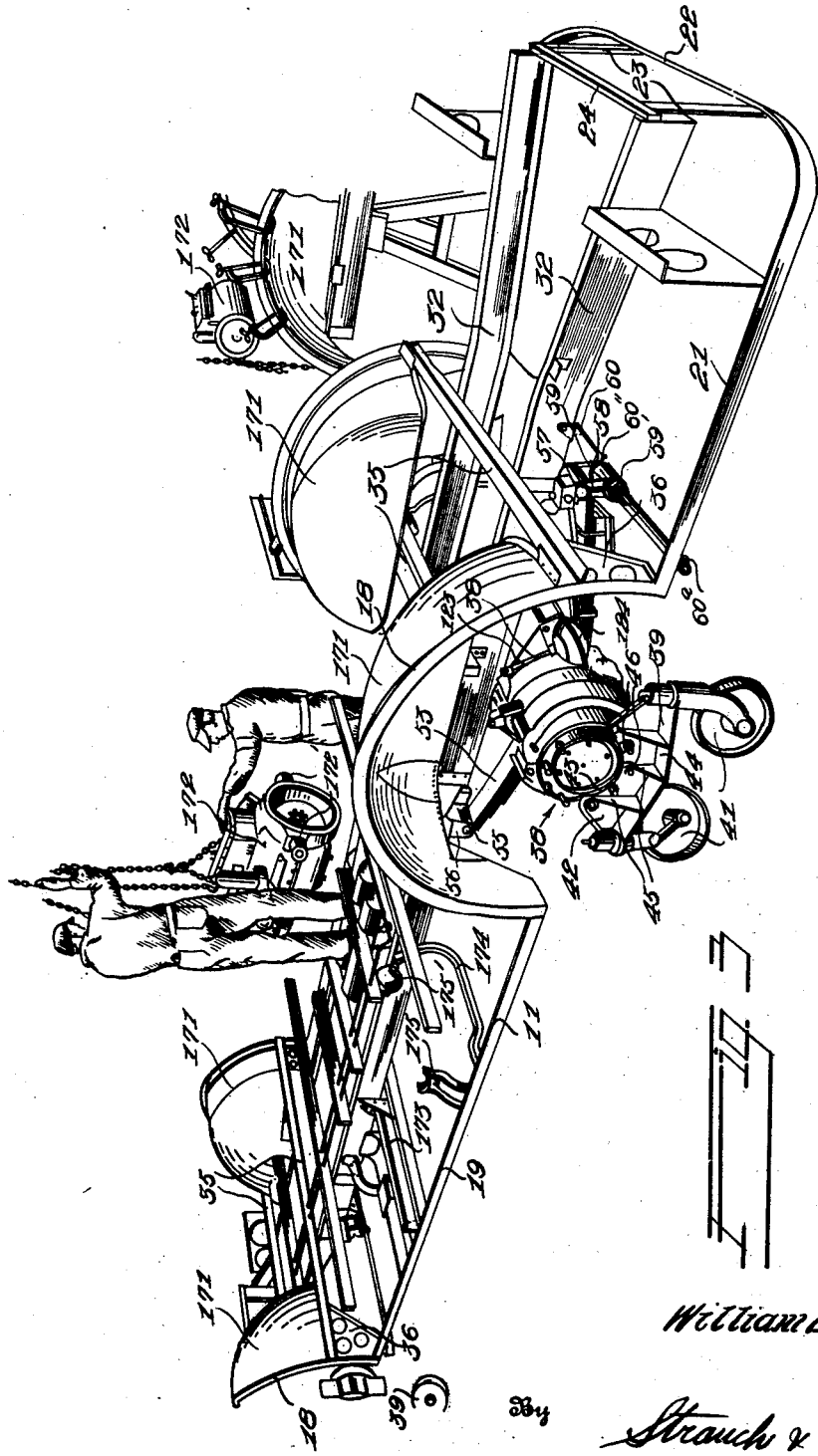

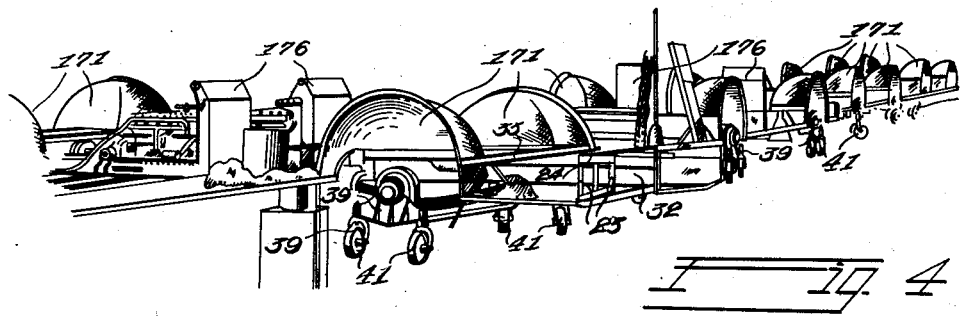
Fig. 4
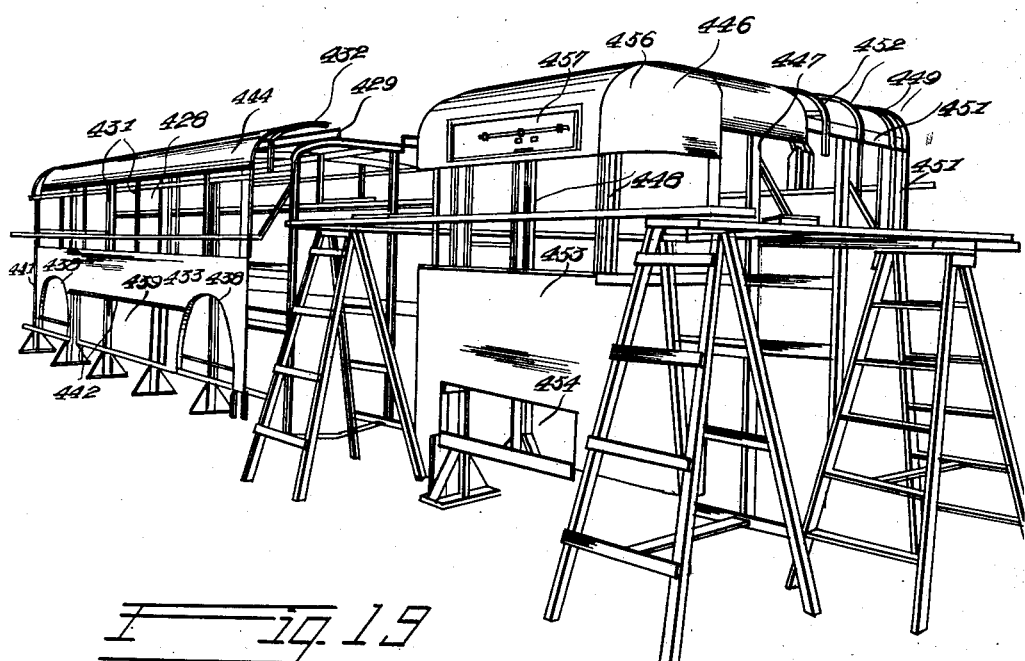
Fig. 19
Fig. 20
Inventor
William B. Fageol
By
Strauch & Hoffman
Attorneys

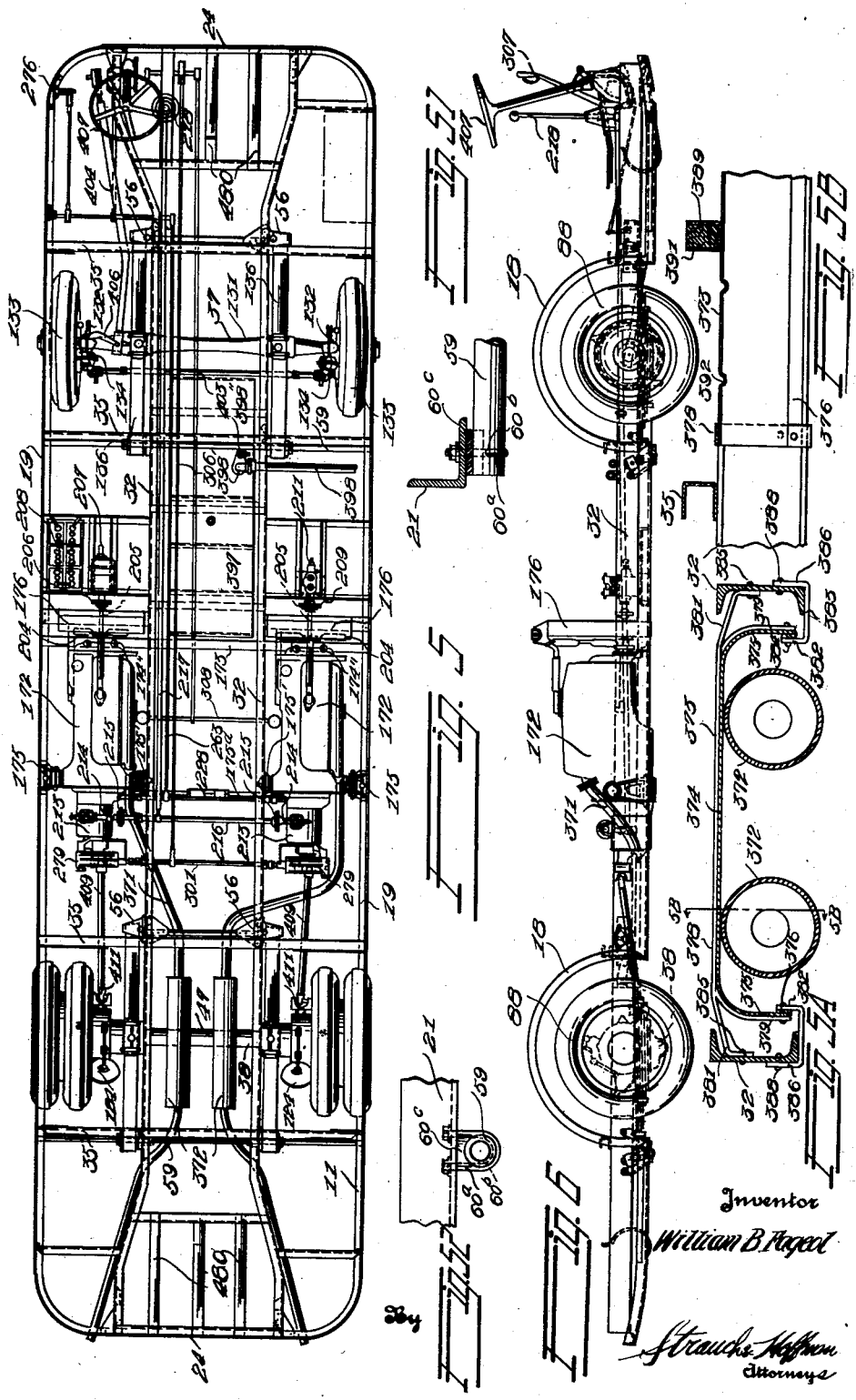

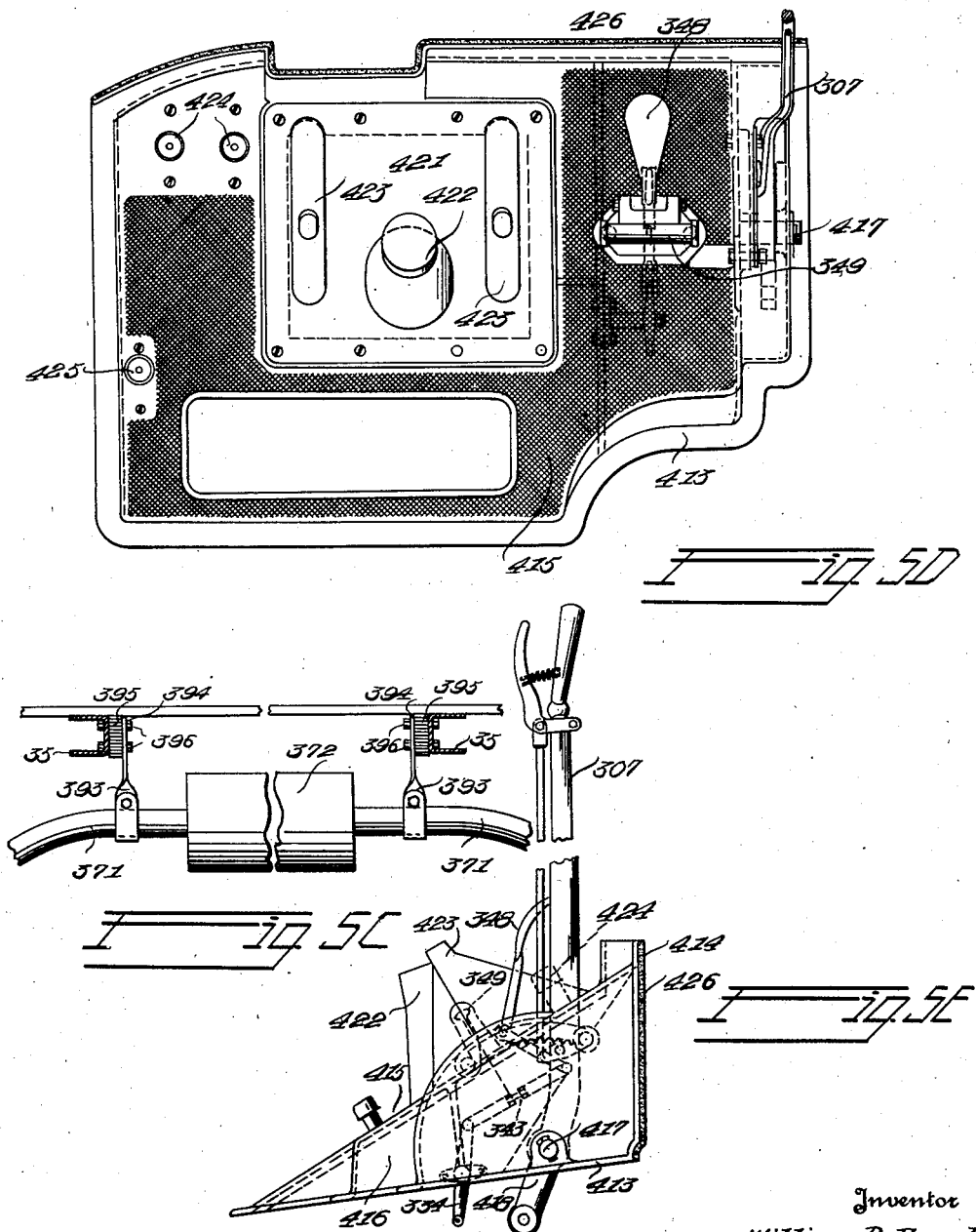

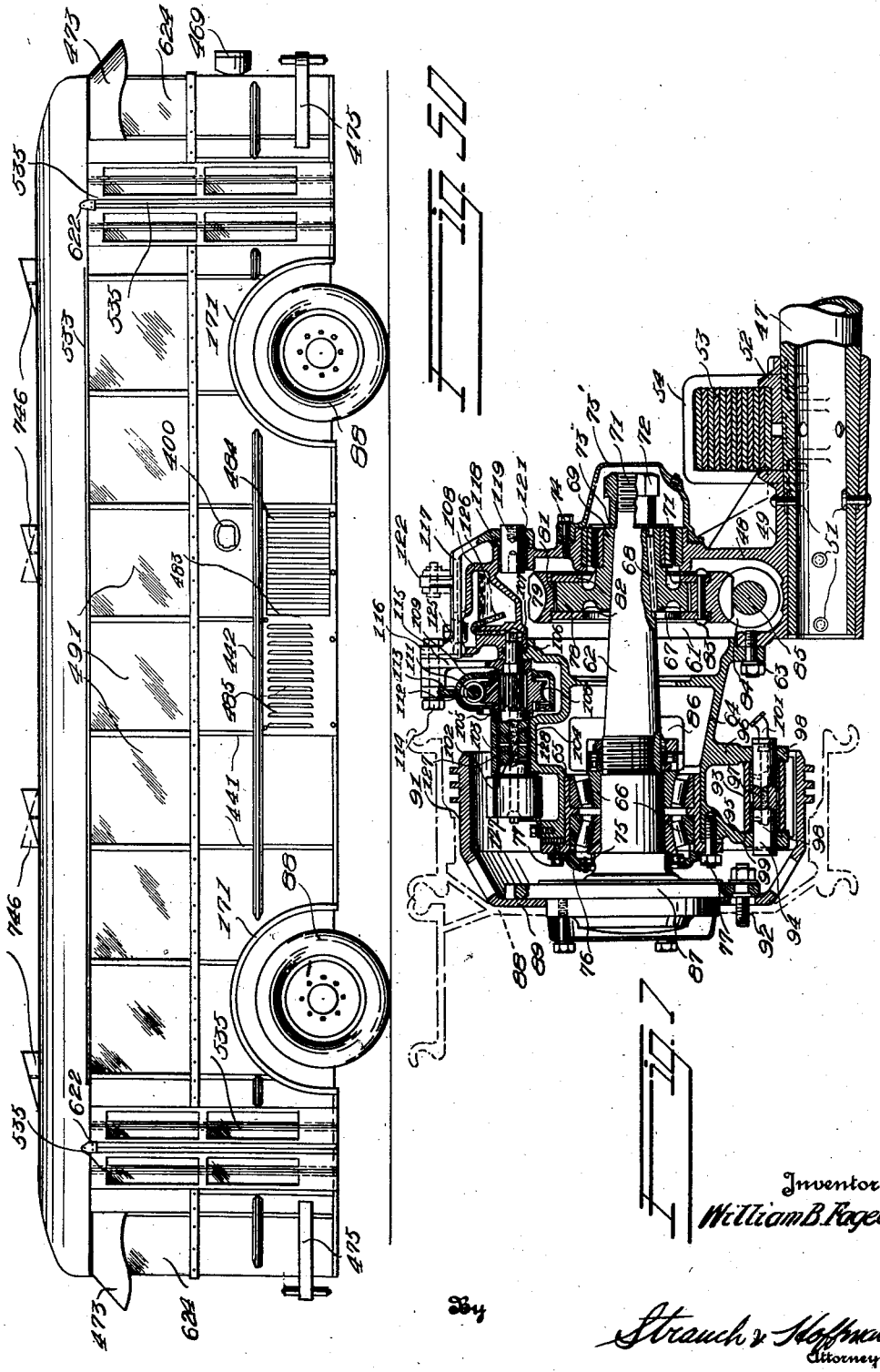

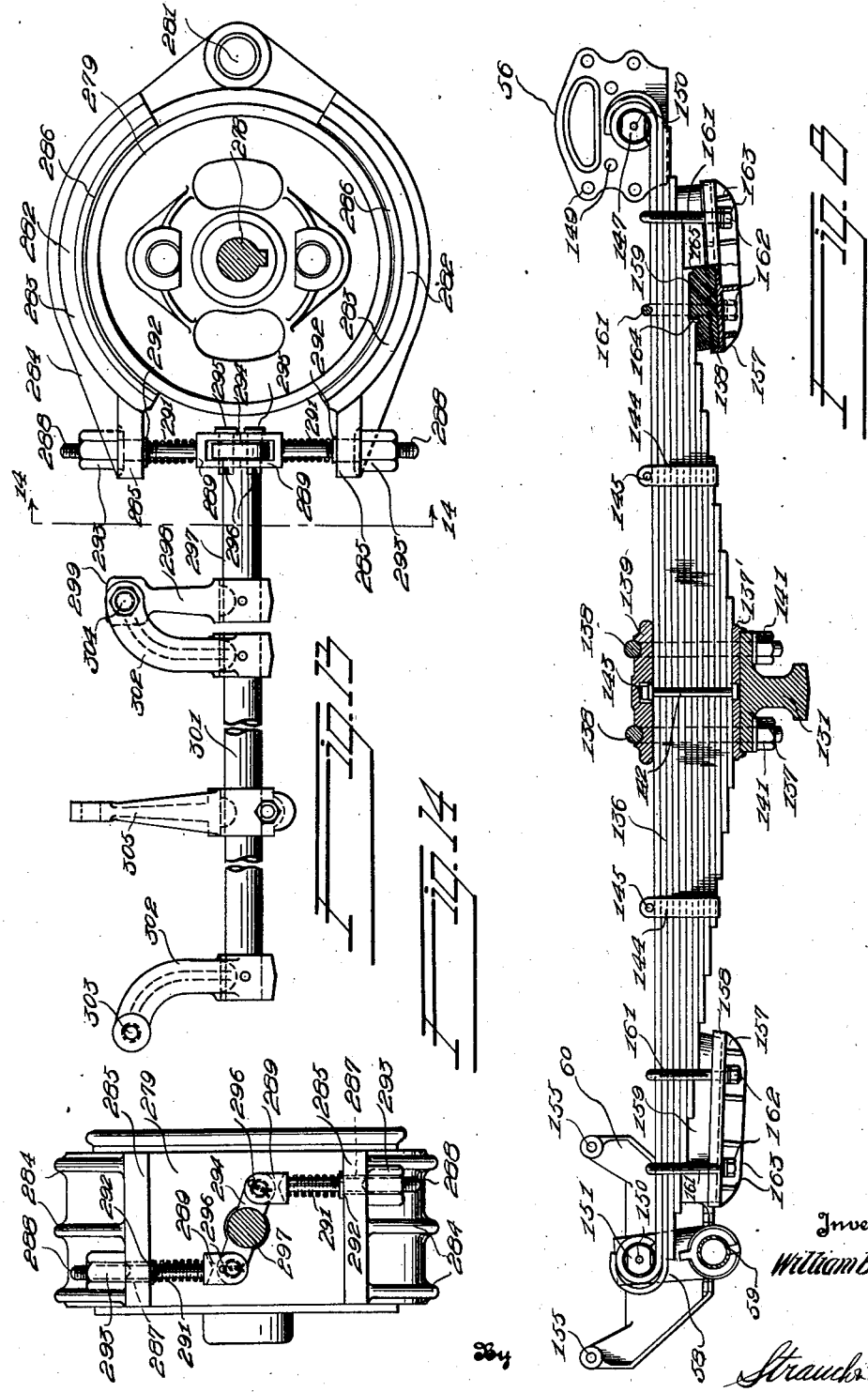

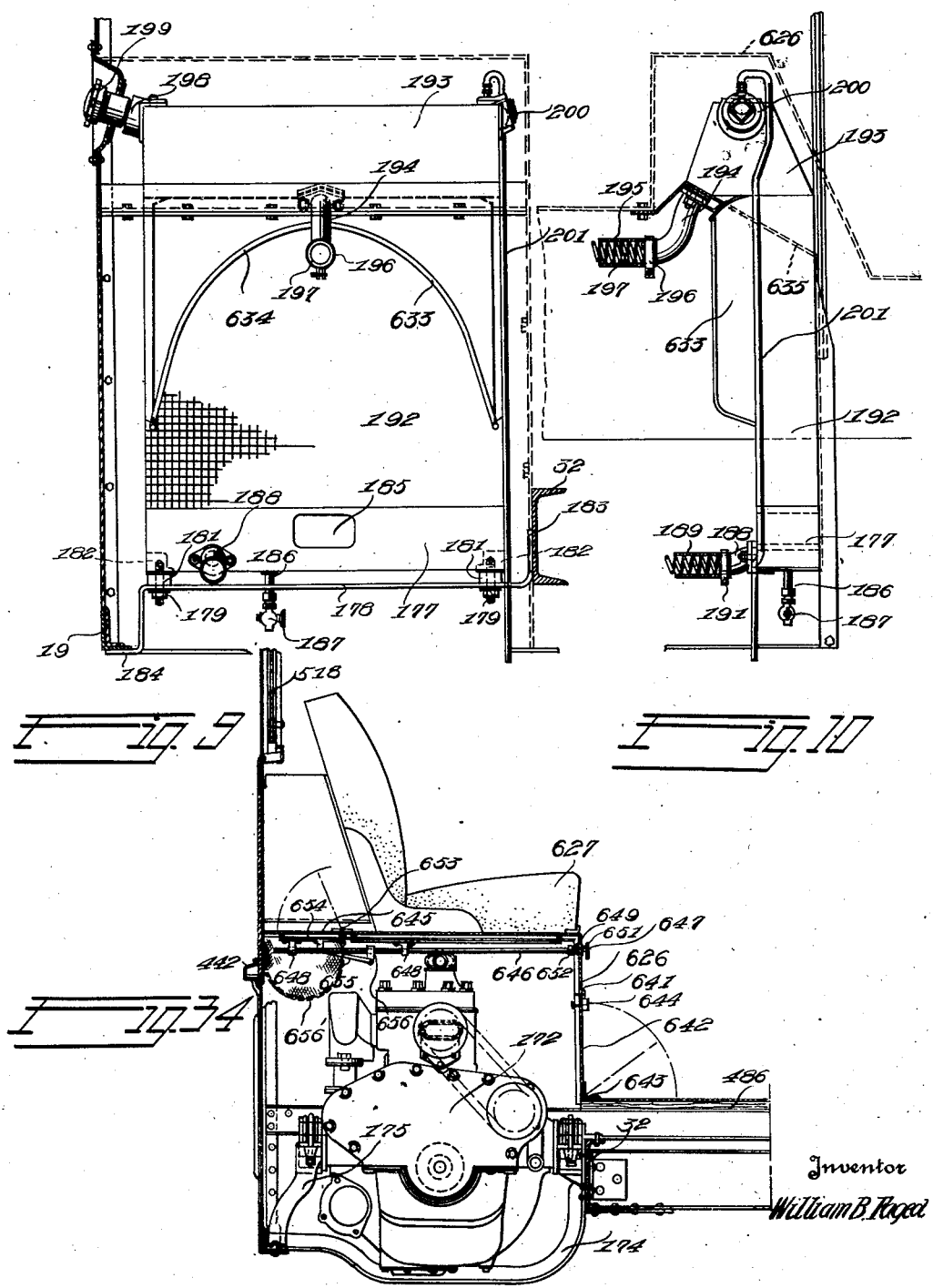

Sept. 13, 1932.  W. B. FAGEOL  1,877,653
MOTOR VEHICLE AND METHOD OF CONSTRUCTING THE SAME
Filed April 17, 1929  22 Sheets-Sheet 9
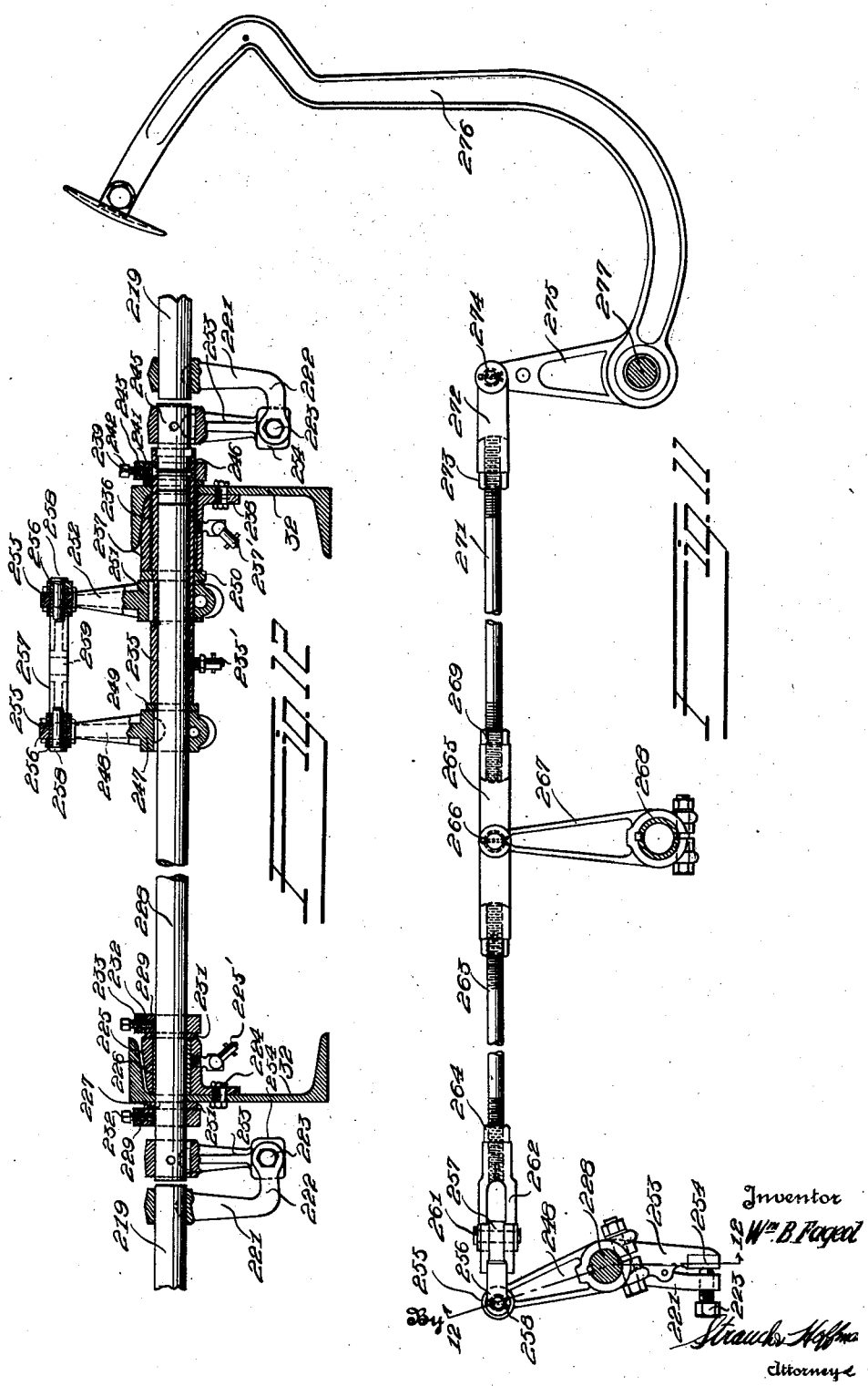

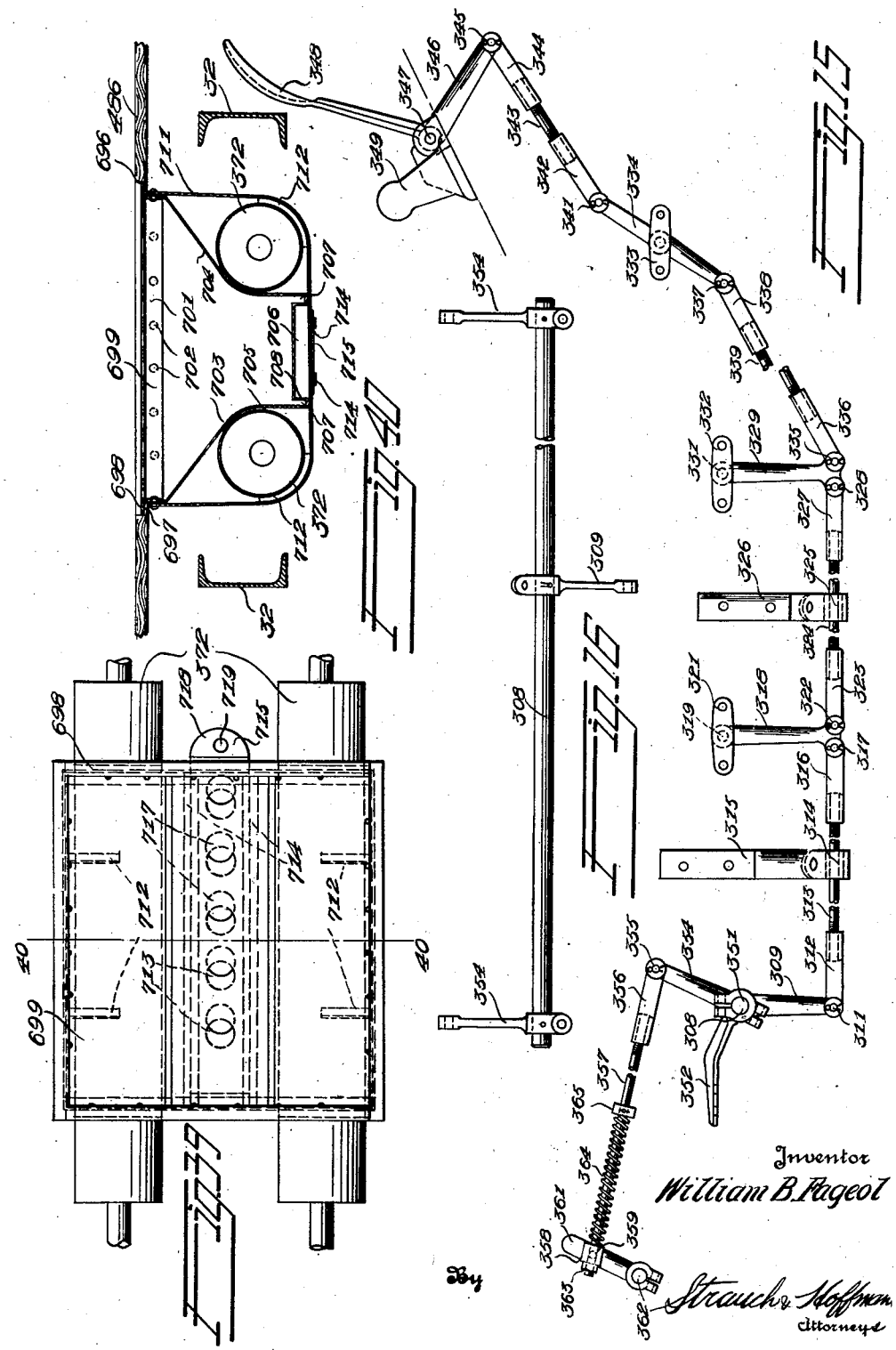

Sept. 13, 1932.  W. B. FAGEOL  1,877,653
MOTOR VEHICLE AND METHOD OF CONSTRUCTING THE SAME
Filed April 17, 1929  22 Sheets-Sheet 11

Inventor
William B. Fageol

By Strauch & Hoffman
Attorneys

Sept. 13, 1932.  W. B. FAGEOL  1,877,653
MOTOR VEHICLE AND METHOD OF CONSTRUCTING THE SAME
Filed April 17, 1929   22 Sheets-Sheet 12
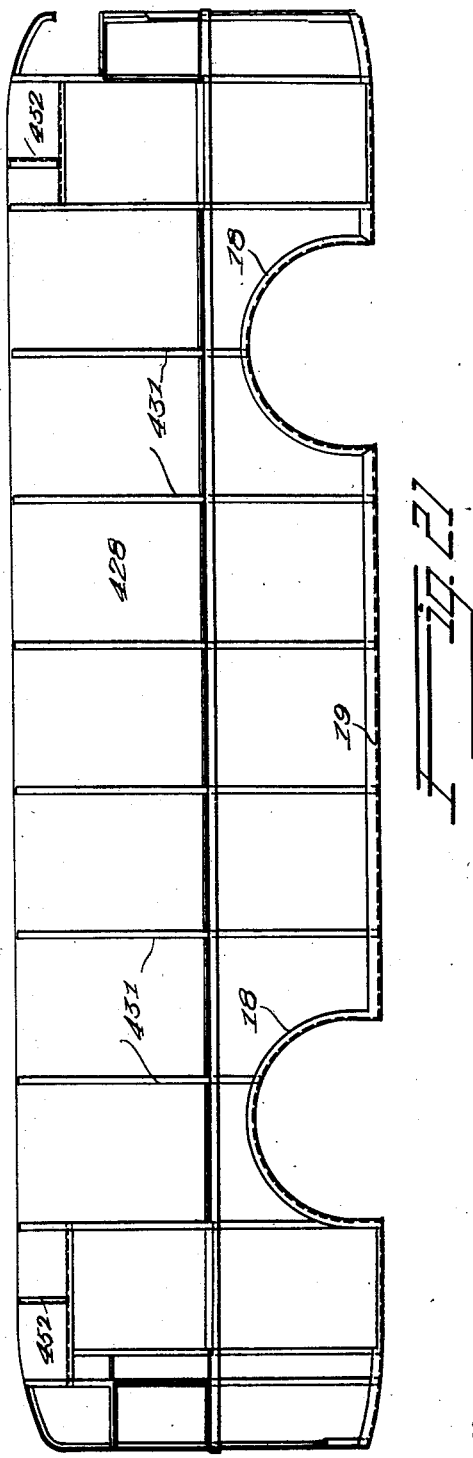
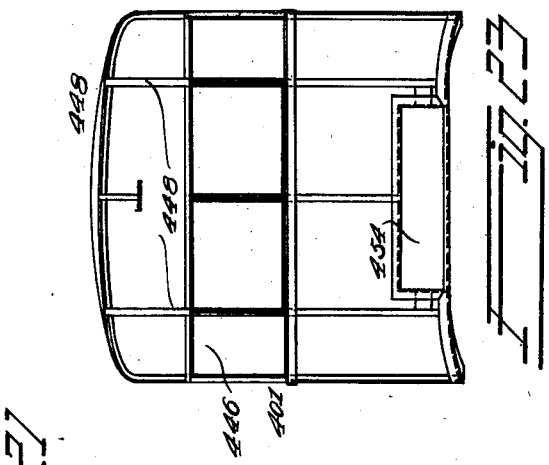
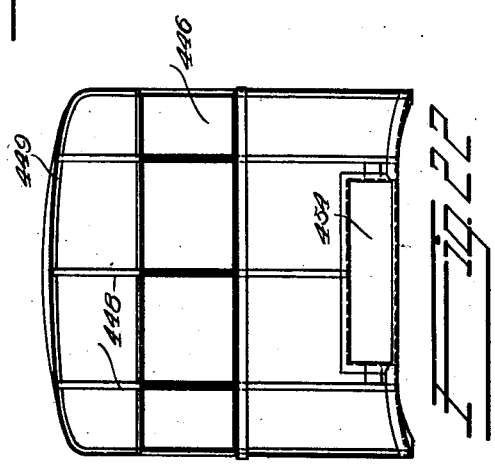
Inventor
William B. Fageol
By
Strauch & Hoffman
Attorneys Sept. 13, 1932. W. B. FAGEOL 1,877,653
MOTOR VEHICLE AND METHOD OF CONSTRUCTING THE SAME
Filed April 17, 1929 22 Sheets-Sheet 13
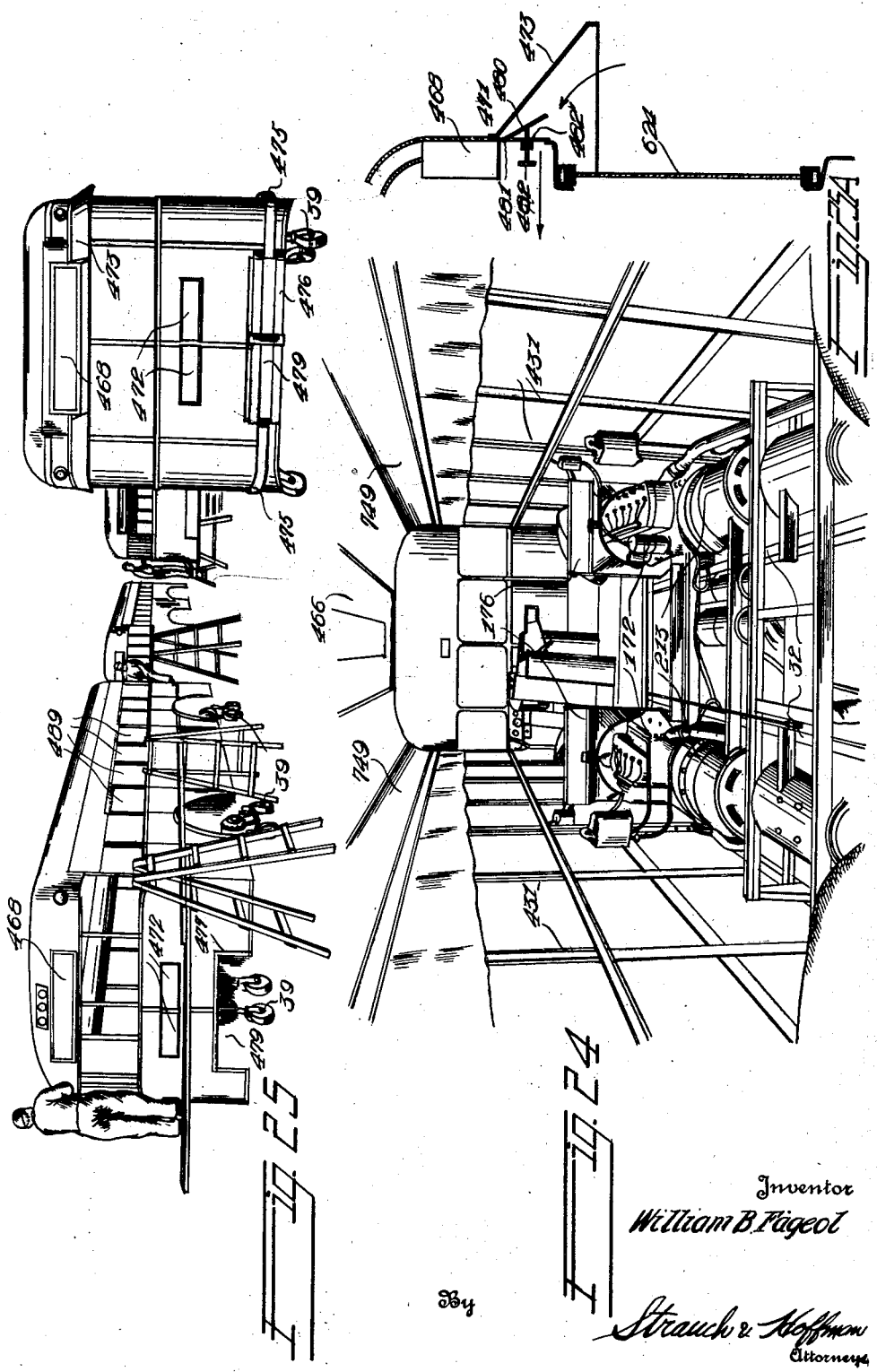
Inventor
William B. Fageol
By
Strauch & Hoffman
Attorneys Sept. 13, 1932.  W. B. FAGEOL  1,877,653
MOTOR VEHICLE AND METHOD OF CONSTRUCTING THE SAME
Filed April 17, 1929    22 Sheets-Sheet 14
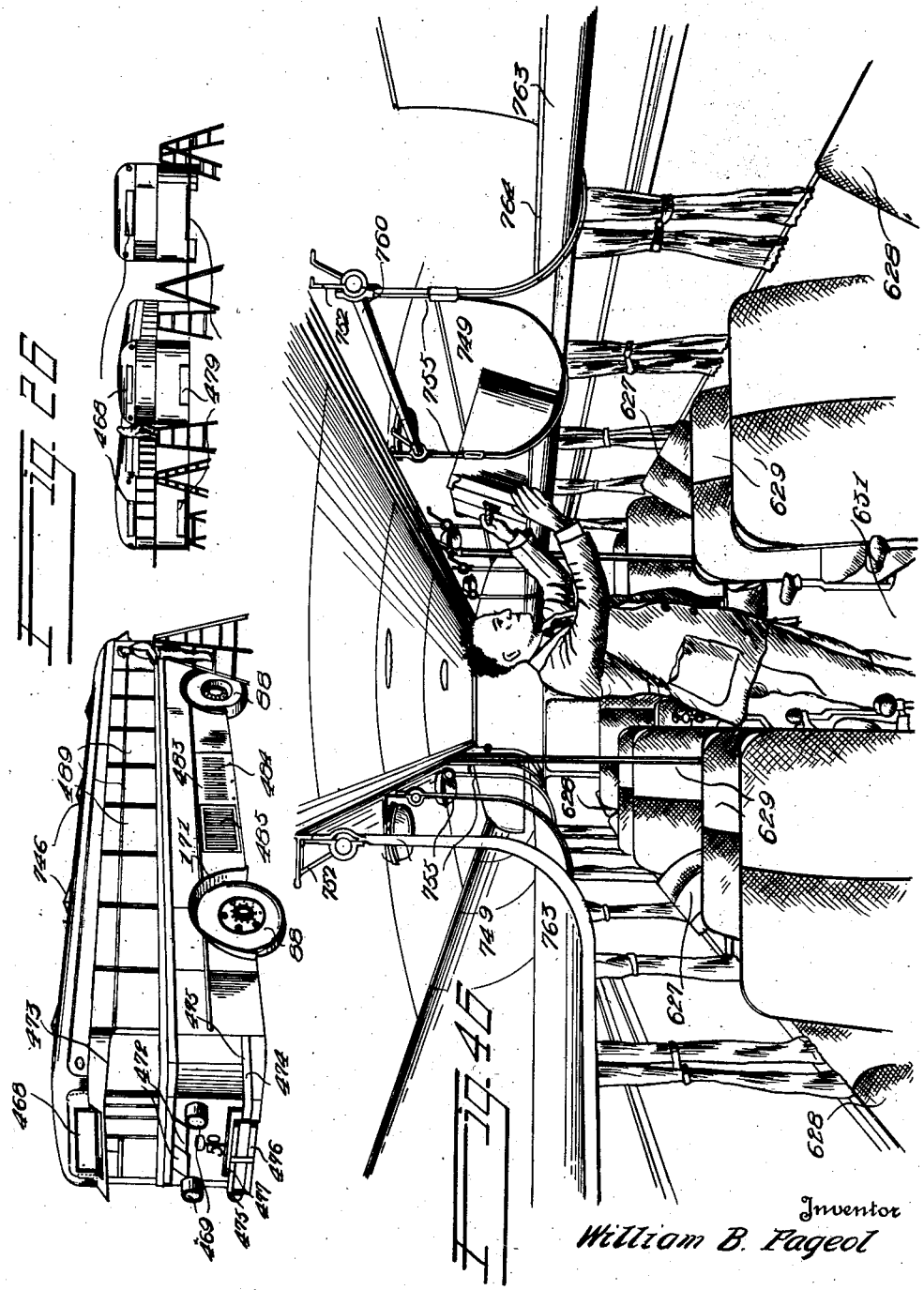
Inventor
William B. Fageol
By
Strauch & Hoffman
Attorneys

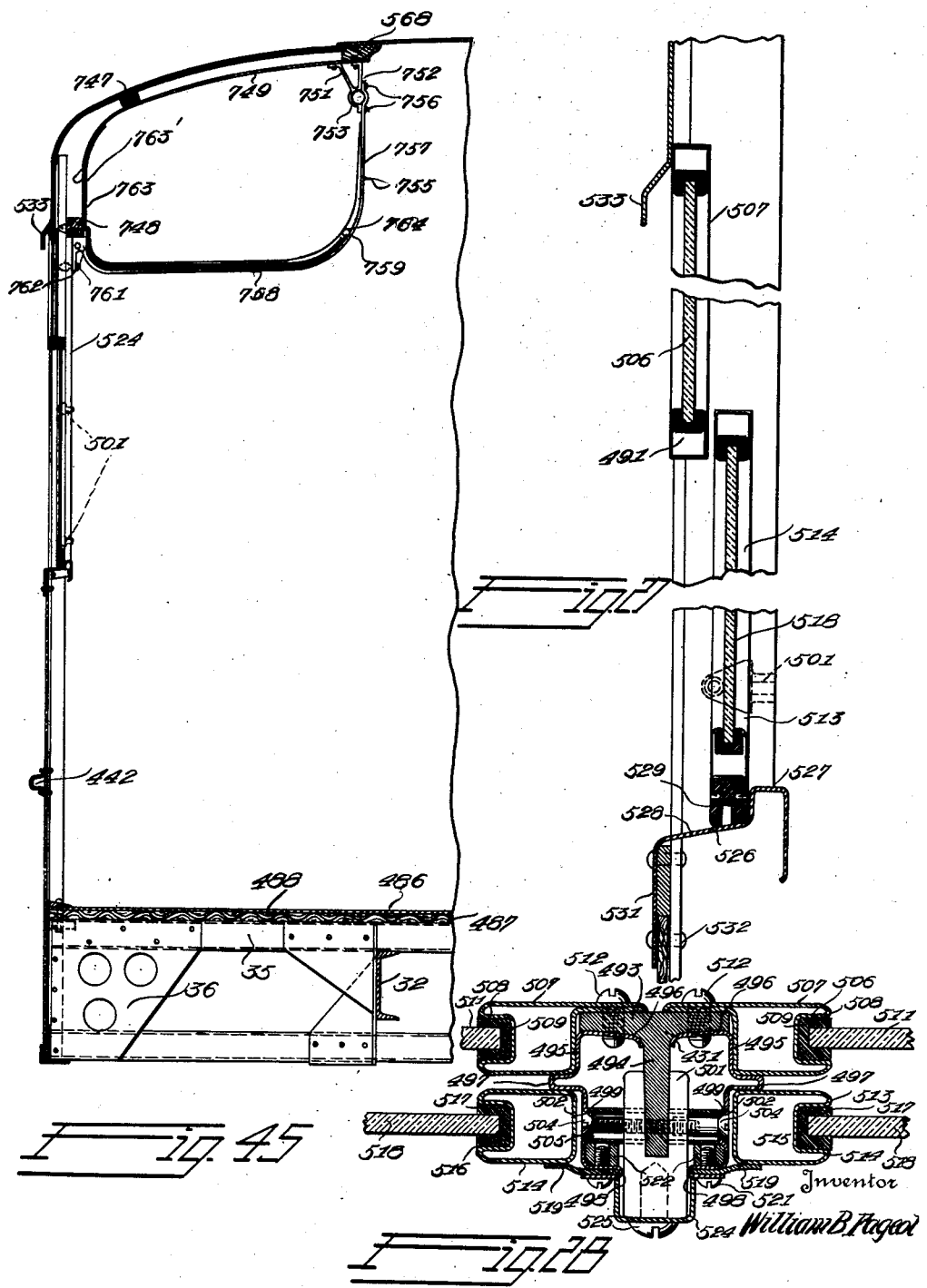

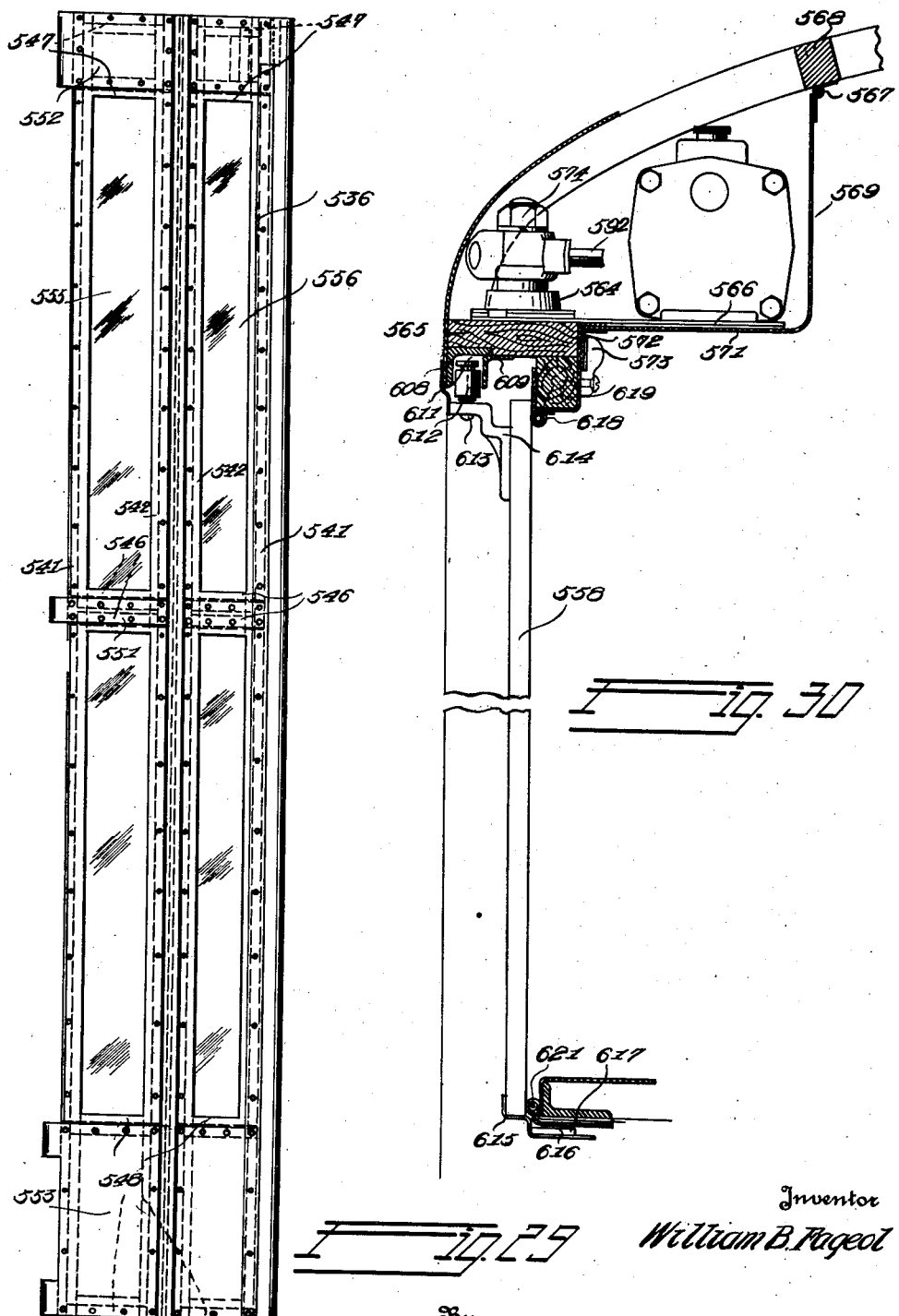

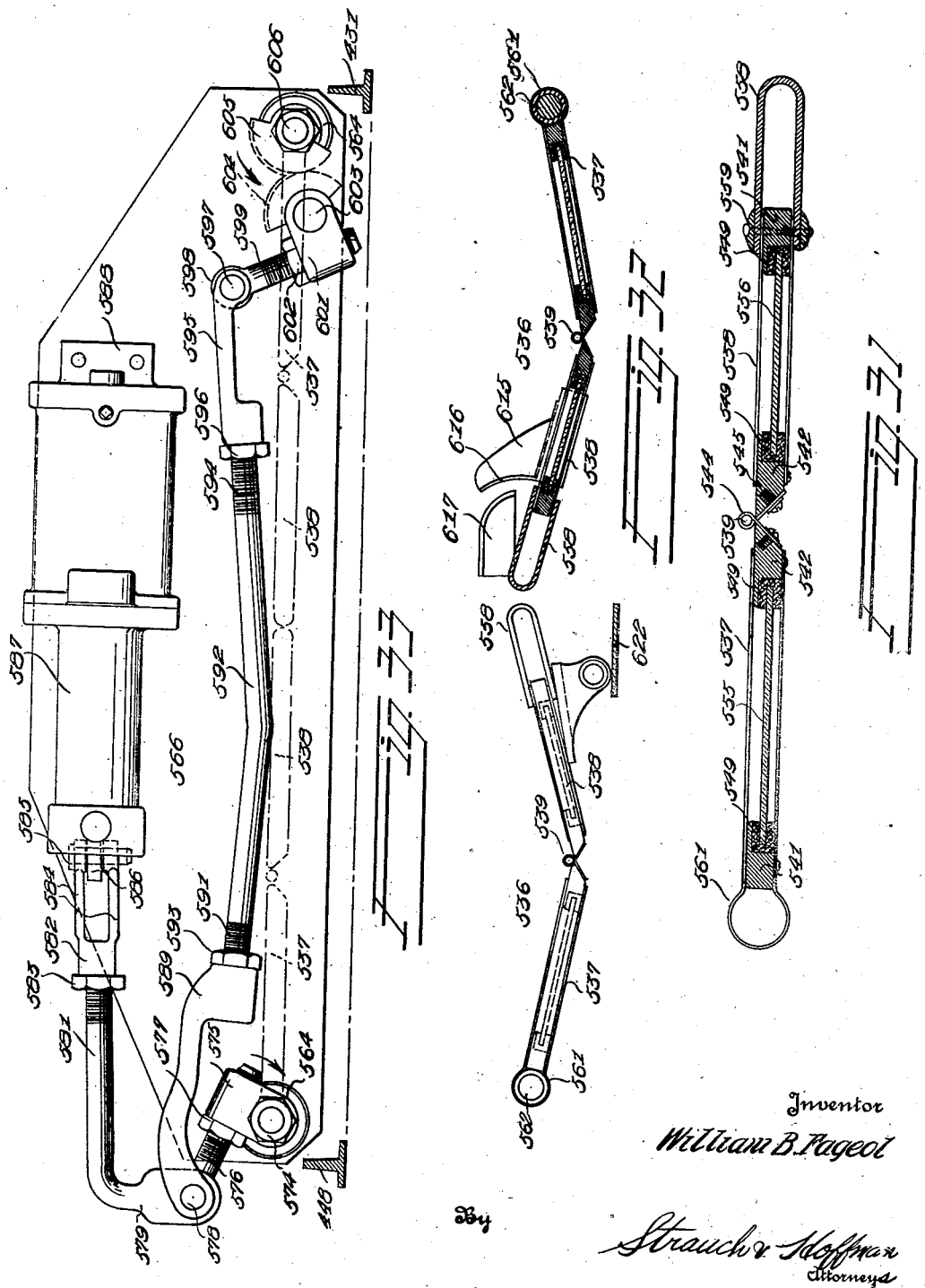

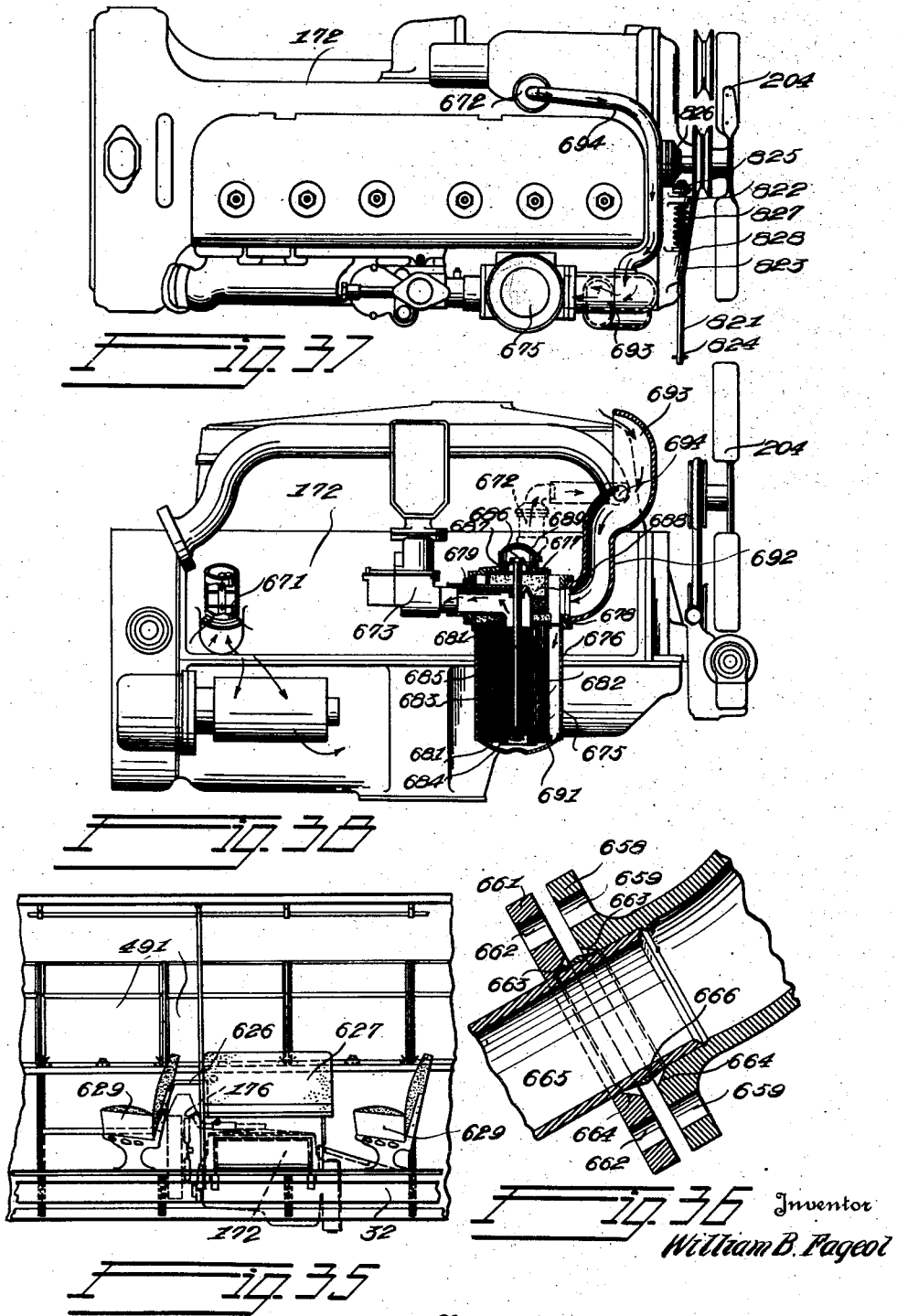

Sept. 13, 1932.   W. B. FAGEOL   1,877,653
MOTOR VEHICLE AND METHOD OF CONSTRUCTING THE SAME
Filed April 17, 1929   22 Sheets-Sheet 19
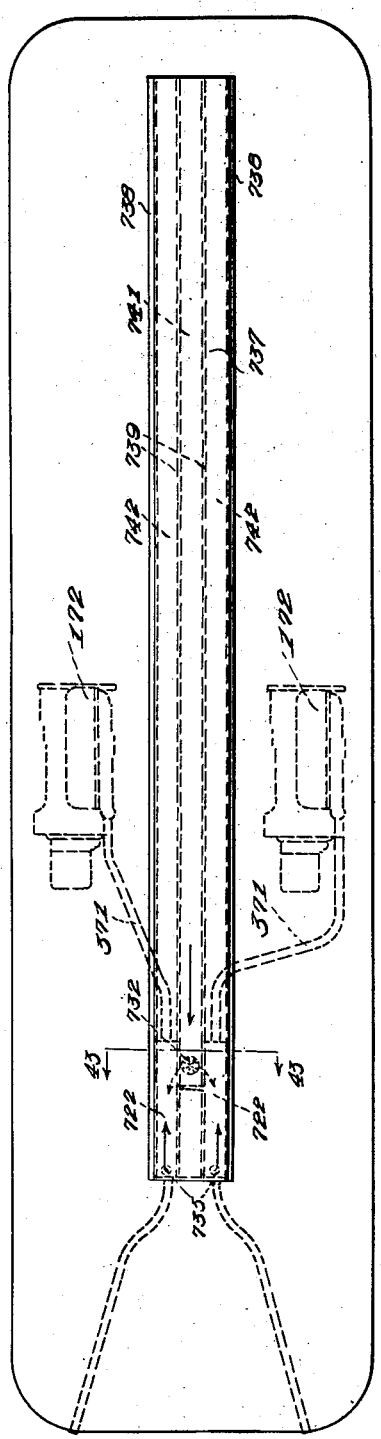
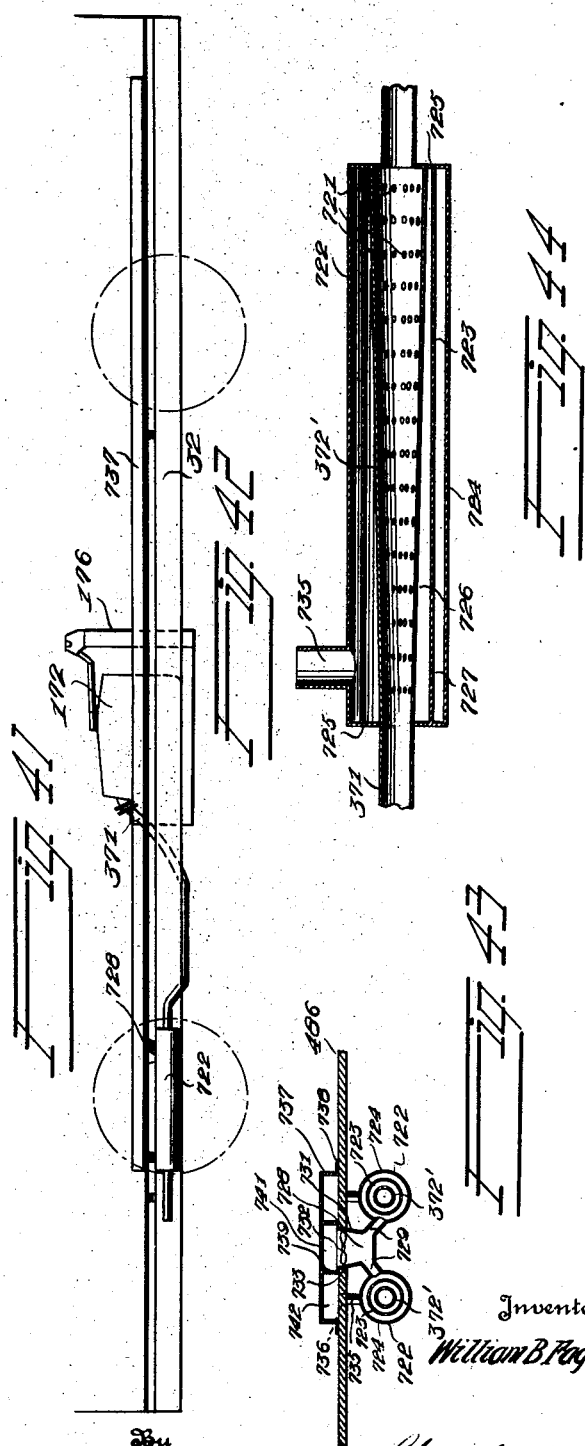
Inventor
William B. Fageol
By
Strauch & Hoffman
Attorneys

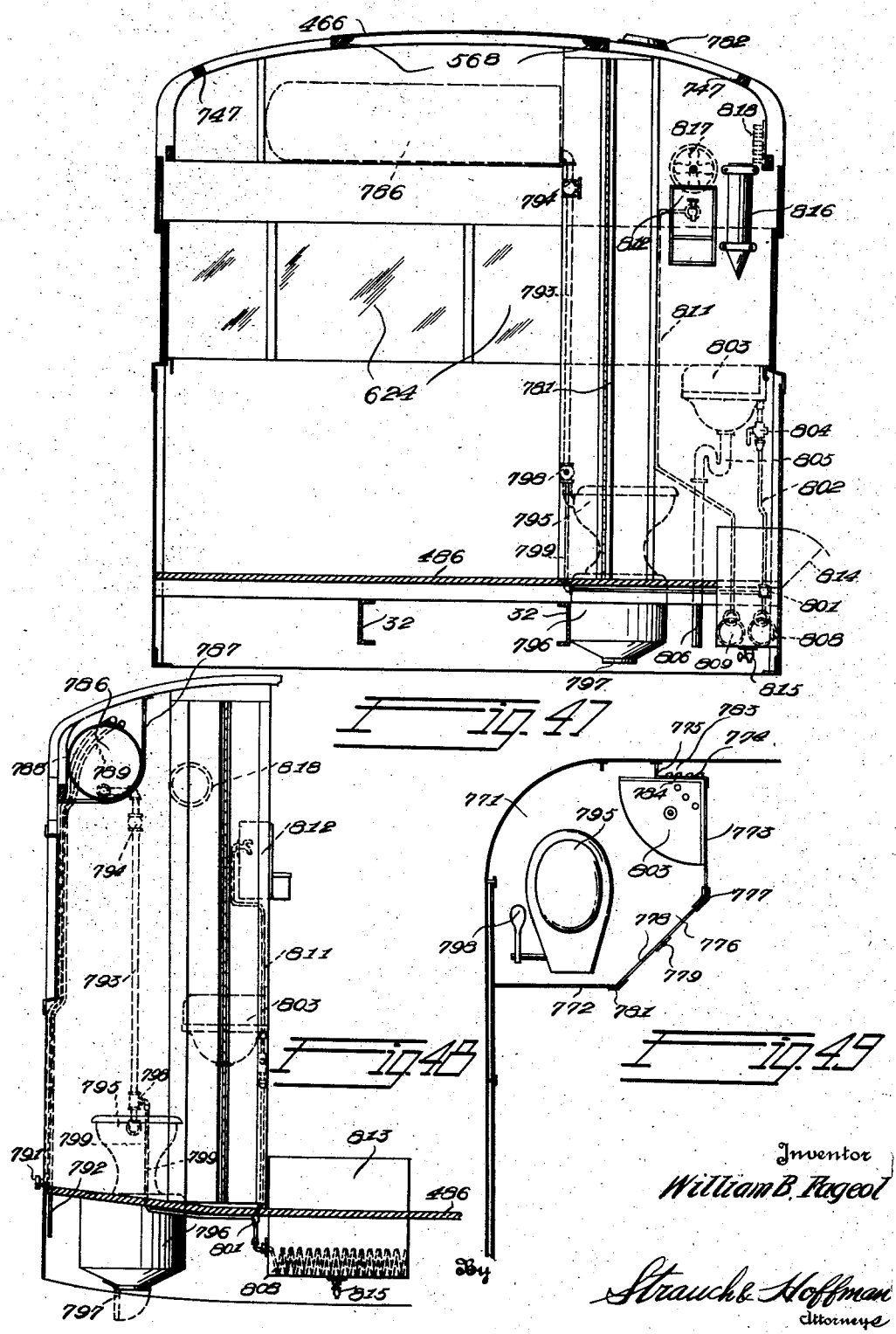

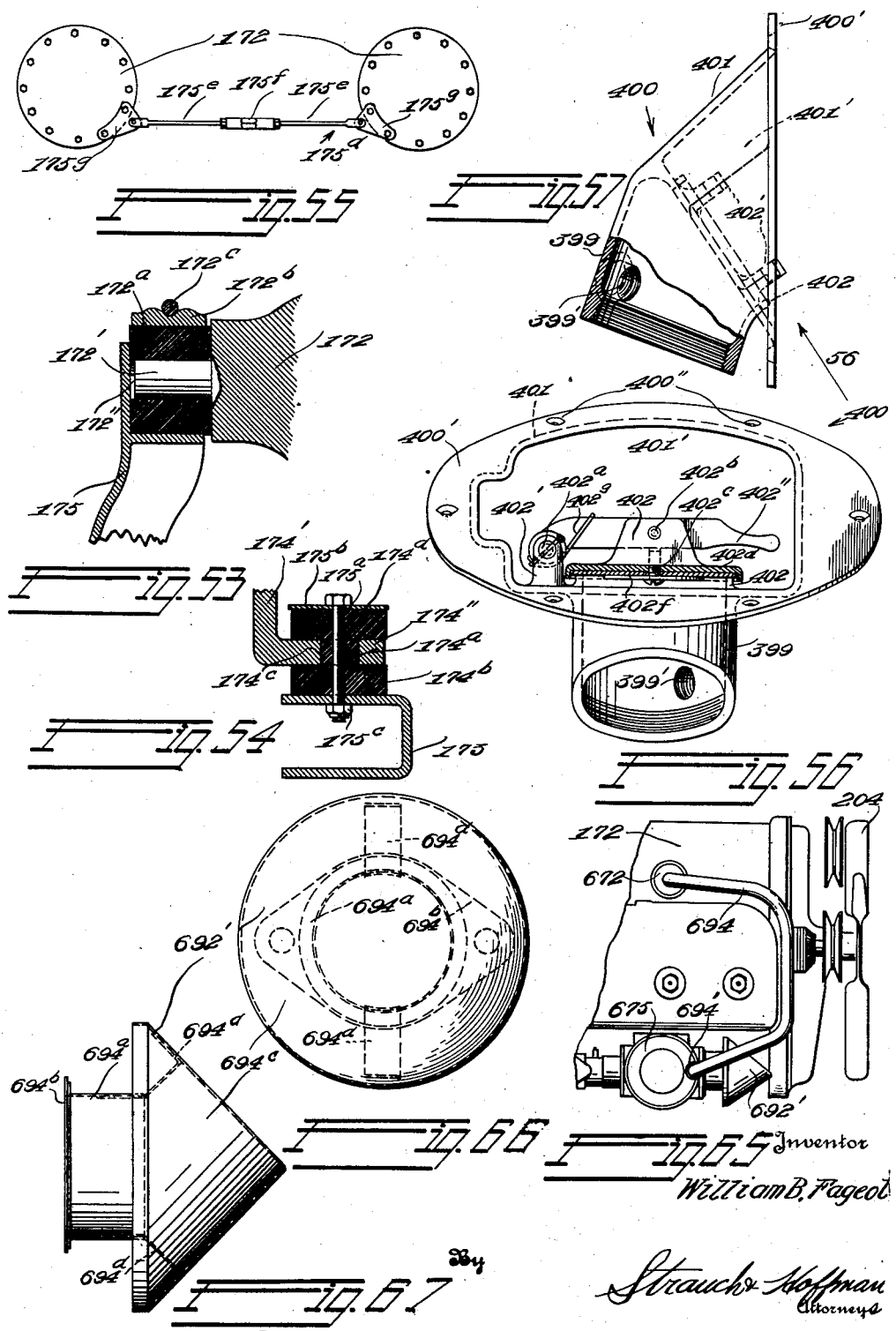

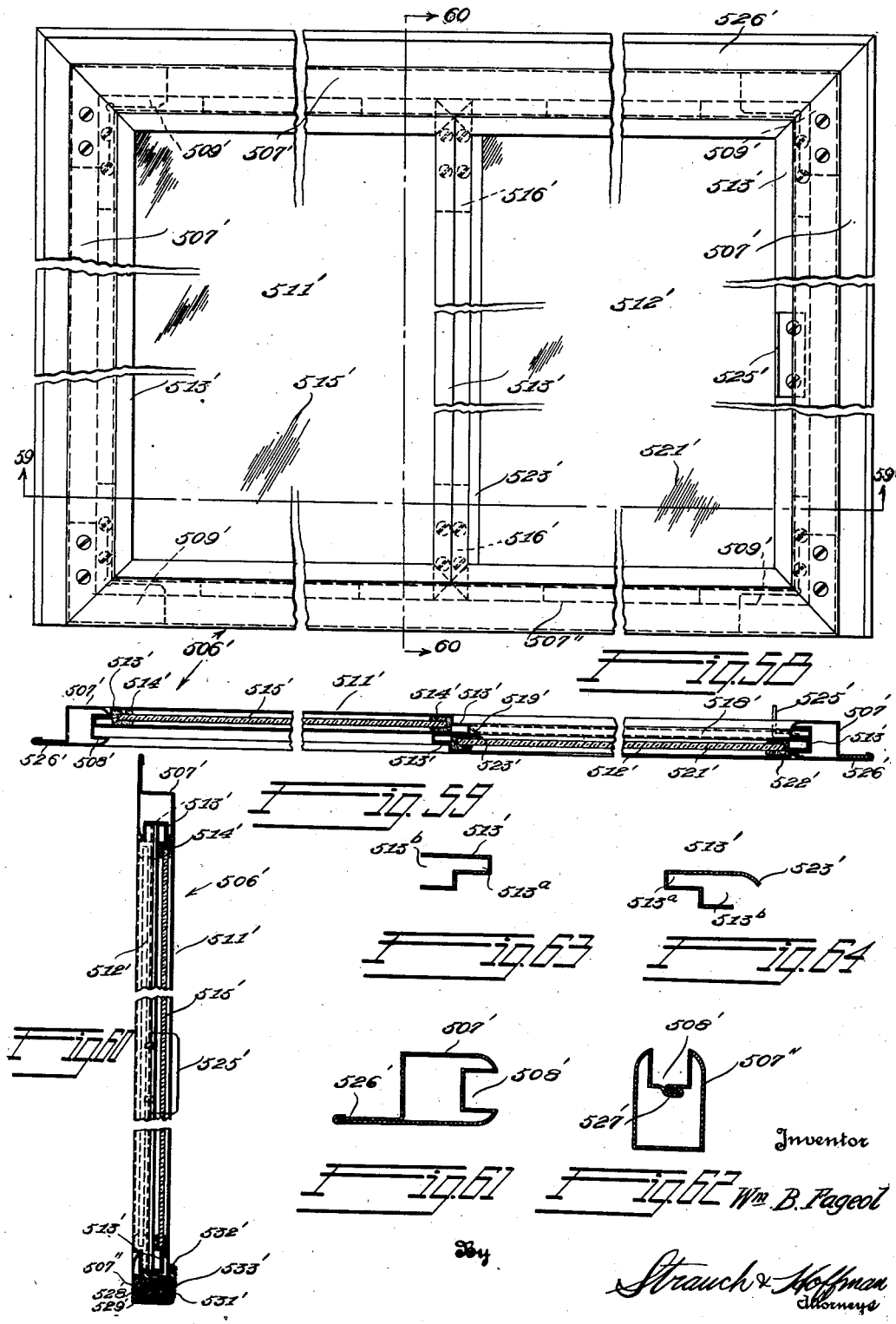

Patented Sept. 13, 1932

1,877,653

UNITED STATES PATENT OFFICE

WILLIAM B. FAGEOL, OF KENT, OHIO, ASSIGNOR TO TWIN COACH COMPANY, OF KENT, OHIO, A CORPORATION OF DELAWARE

MOTOR VEHICLE AND METHOD OF CONSTRUCTING THE SAME

Application filed April 17, 1929. Serial No. 355,755.

The present invention relates to novel coach constructions and methods of construction and assembly thereof, and more particularly, the invention relates to automotive vehicles of the coach or bus type, having minimum weight and maximum carrying capacity.

A primary object of the present invention is to provide novel methods of construction and assembly of motor vehicles and bodies therefor, that permit convenient, rapid, and low cost manufacture, maintenance, servicing and repair.

Another object of the present invention is to provide novel methods of construction and assembly of motor coaches in progressive manner and in a flexible assembly line at successive assembling stations.

It is still another object of the present invention to provide novel coach constructions comprising dual motors, power transmissions, and equalizing dual control means to effect coordinated or independent operation of the motors and elements associated therewith.

A further object of the present invention is the provision of novel coach constructions and heating means therefor utilizing waste motor heat.

A still further object of the present invention is the provision of novel coach body and ventilating arrangements associated to provide effective ventilation without subjecting passengers to undesirable drafts.

Another object of the present invention is the provision of a novel coach construction provided with a motor or motors arranged in a housing projecting into the body and provided with means for conducting heated air from said housings into the coach body, and for preventing exhaust gas fumes and crank case fumes from contaminating the air in the housings.

Still another object of my invention is the provision of novel coach body constructions comprising improved door and window constructions; novel arrangements to prevent body noises and rattling, and improved light weight and yieldable but strong body constructions, insulated against heat and cold, that will withstand severe collision shocks without danger to passengers.

A further object of the present invention is the provision of novel coach body constructions with detachable baggage rack constructions capable of supporting a maximum volume of baggage without encroaching upon the comfort of passengers or the passenger carrying space.

A still further object of the present invention is the provision of novel coach body constructions comprising novel compact lavatory arrangements and ventilating means therefor.

Another object of the present invention is the provision of a coach construction comprising a body formed of a skeleton framework, and a laminated covering secured to said framework, said covering being of such construction and composition that it is strong, heat insulating and will gradually yield to sudden impacts thus partially absorbing such impacts and substantially reducing the transmission thereof throughout the extent of the body.

Further objects of the invention are such as may be attained by a utilization of the various combinations and sub-combinations hereinafter set forth and as defined by the terms of the appended claims.

Referring to the drawings:

Figure 1 (sheet 1) is a perspective view illustrating the initial body frame construction of the preferred embodiment of my invention showing a method of forming same on a template construction.

Figure 2 (sheet 1) is a perspective view illustrating a succeeding step in the body frame construction in which the frame section constructed at the station shown in Figure 1 is secured to the main body floor channels.

Figure 3 (sheet 2) is a perspective view illustrating one of the assembly stations at which the motors are mounted in the body frame.

Figure 4 (sheet 3) is a perspective view showing a plurality of chassis in various stages of assembly in the continuous assembly line forming a part of my improved methods of constructing vehicles.

Figure 5 (sheet 4) is a top plan view of one of the body frame constructions after completion in the assembly line of Figure 3 with the wheels assembled and the housings therefor omitted.

Figure 5A (sheet 4) is a transverse sectional view of a muffler floor shield installation embodied in one form of my invention to prevent fires due to muffler failure.

Figure 5B (sheet 4) is a partial longitudinal sectional view taken on line 5B—5B in Figure 5A.

Figure 5C (sheet 5) is a broken side elevational view of a cushioned muffler support from the body frame with some parts shown in section to dampen and absorb muffler vibrations in my improved vehicles.

Figure 5D (sheet 5) is a top view as seen at a slight angle to the vertical of a locating control casting and assembly for the forward end of the improved vehicle.

Figure 5E (sheet 5) is a side elevational view of the construction illustrated in Figure 5D.

Figure 6 (sheet 4) is a side elevational view of the assembled construction illustrated in Figure 5.

Figure 7 (sheet 6) is a vertical longitudinal sectional view of one of the rear wheel mountings in a preferred form of coach embodying my invention.

Figure 8 (sheet 7) is a side elevational view partially in section of one of the leaf spring assemblies embodied in my invention.

Figure 9 (sheet 8) is a rear elevational view of a radiator assembly and shroud arrangement forming one of the novel elements of my invention.

Figure 10 (sheet 8) is a side elevational view partially in section of the construction illustrated in Figure 9.

Figure 11 (sheet 9) is a fragmental foreshortened broken side elevational view of a novel clutch control mechanism forming part of my invention.

Figure 12 (sheet 9) is a vertical transverse sectional view of the construction illustrated in Figure 11 taken substantially on broken line 12—12 and showing the main longitudinal body frame members.

Figure 13 (sheet 7) is a fragmental broken elevational view of a propeller shaft brake mechanism forming part of my invention.

Figure 14 (sheet 7) is a fragmental transverse section on line 14—14 Figure 13.

Figure 15 (sheet 10) is a fragmental side elevational view of an improved carburetor control mechanism and the supporting means therefor forming part of my invention.

Figure 16 (sheet 10) is an elevational view at right angles to the view in Figure 15 disclosing part of the mechanism thereof showing the method of providing a dual motor control.

Figure 19 (sheet 3) is a perspective view illustrating the stations and templates for, and methods of construction of the body side and end units or sections prior to their assembly on the body frame construction.

Figure 20 (sheet 3) is an enlarged transverse sectional view of the laminated material employed for covering the structural metal skeleton framework of the side and end members entering into the body construction.

Figures 21, 22 and 23 (sheet 12) are respectively fragmental side and opposite end elevational views illustrating particularly the upper light structural metal box like body frame construction that is built up on the main or bottom section of the frame work in which the mechanism is assembled.

Figure 24 (sheet 13) is a perspective view of the interior of a coach subsequent to the assembly of the sides, ends, and top on the main body frame, and prior to the finishing of the interior, illustrating particularly the relative disposition of the various power and control elements of the coach.

Figure 25 (sheet 13) is a perspective view showing a plurality of coaches at the finishing assembly line stations, undergoing the application of the various external parts subsequent to the assembly of the body sections with the chassis.

Figure 25A (sheet 13) is a fragmental longitudinal sectional view through the front end of the coach body illustrating a ventilator arrangement forming part of my invention.

Figure 26 (sheet 14) is a perspective view of a plurality of coaches completed in accordance with the operations performed as illustrated in Figure 25 and undergoing the final operations such as painting etc.

Figure 27 (sheet 15) is a transverse vertical sectional view of one of the windows with which the improved body construction of my invention is provided.

Figure 28 (sheet 15) is a fragmental transverse sectional view indicating the supporting and guiding arrangement for the upper and lower sash of each window.

Figure 29 (sheet 16) is a fragmental elevational view of an improved collapsible coach door section preferably embodied in my invention.

Figure 30 (sheet 16) is a broken vertical sectional view disclosing the guiding and actuating means for my improved coach doors.

Figure 31 (sheet 17) is a fragmental transverse sectional view of one of the door sections as illustrated in Figure 29 on an enlarged scale.

Figure 32 (sheet 17) is a fragmental view disclosing the top of one of my improved door sections and a section of the adjacent door section near the bottom thereof particularly illustrating the top and bottom guiding means for the adjacent door sections.

Figure 33 (sheet 17) is a top plan view of the door actuating means with the doors indicated in dot and dash lines.

Figure 34 (sheet 8) is a fragmental transverse sectional view through one of the coach motor housings and seats illustrating a novel heating arrangement.

Figure 35 (sheet 18) is a fragmental interior side view of a coach illustrating the housing shown in Figure 34 and the passenger seating arrangement with respect thereto.

Figure 36 (sheet 18) is a longitudinal sectional view illustrating a novel manifold-exhaust pipe located in the motor housing connection forming one of the elements of my invention to prevent contamination of the motor housing and coach atmosphere so that the housing air may be safely circulated through the coach body for heating purposes.

Figure 37 (sheet 18) is a top plan view of one of the motors disclosing the application of a novel crank case breather and carburetor air cleaner arrangement to maintain the air in the motor housing and coach body free from crank case fumes.

Figure 38 (sheet 18) is a side elevational view partially in section of the construction illustrated in Figure 37.

Figure 39 (sheet 10) is a top plan view of an auxiliary heating arrangement for use with my invention.

Figure 40 (sheet 10) is a transverse sectional view on line 40—40 Figure 39 showing a portion of the floor and main chassis beams.

Figure 41 (sheet 19) is a diagrammatic top plan view illustrating a preferred form of a front body and heating arrangement for use with my invention.

Figure 42 (sheet 19) is a side view partially broken away of the construction illustrated in Figure 41.

Figure 43 (sheet 19) is a transverse sectional view as seen on line 43—43 Figure 41.

Figure 44 (sheet 19) is an enlarged longitudinal sectional view of one of the mufflers and associated heat collecting housings forming part of the heating arrangement.

Figure 45 (sheet 15) is a transverse sectional view through a portion of the body illustrating a novel baggage rack construction embodied in my invention.

Figure 46 (sheet 14) is a body interior perspective view illustrating the seating arrangement and my novel baggage rack constructions.

Figure 47 (sheet 20) is a transverse sectional view through a "de luxe" body construction adjacent the rear end thereof and viewed in the same direction disclosing a novel toilet arrangement forming part of my invention.

Figure 48 (sheet 20) is a partial longitudinal sectional view showing the improved toilet construction at right angles to the showing in Figure 47.

Figure 49 (sheet 20) is a horizontal sectional view showing particularly the wall arrangement enclosing the improved toilet compartment as well as the relative dispositions of the commode and lavatory.

Figure 50 (sheet 6) is a side elevational view of a completed coach embodying my inventions disclosing particularly the general external appearance, relative dimensions of the body and the relative dispositions of the wheels, windows, doors etc. of a preferred embodiment of my invention.

Figure 51 (sheet 4) is a transverse sectional view through one side of the body-frame construction disclosing the connection of the adjacent end of one of the spring shackle bars thereto.

Figure 52 (sheet 4) is a broken elevational view of the construction illustrated in Figure 51 as seen from the left thereof in the direction of the longitudinal axis of the shackle bar.

Figure 53 (sheet 21) is a transverse sectional view of a portion of one of the motors and a supporting bracket therefor disclosing one of the yielding supports for the motor.

Figure 54 (sheet 21) is a transverse sectional view of one of the body frame bars and a lug integral with a side of one of the motors disclosing a yieldable connection between said bar and said lug.

Figure 55 (sheet 21) is an end elevational view of the motors disclosing an adjustable connection therebetween.

Figure 56 (sheet 21) is an elevational view of a gasoline filling member adapted for connection with one of the vehicle body sides for introduction of gasoline to the gas tank, the view being observed in the direction of arrow 56 in Figure 57.

Figure 57 (sheet 21) is a side elevational view partially in section of the construction illustrated in Figure 56.

Figure 58 (sheet 22) is a broken side elevational view of a modified form of upper stationary ventilating sash.

Figure 59 (sheet 22) is a transverse sectional view taken on line 59—59 of Figure 58.

Figure 60 (sheet 22) is a sectional view taken on line 60—60 of Figure 58.

Figure 17:
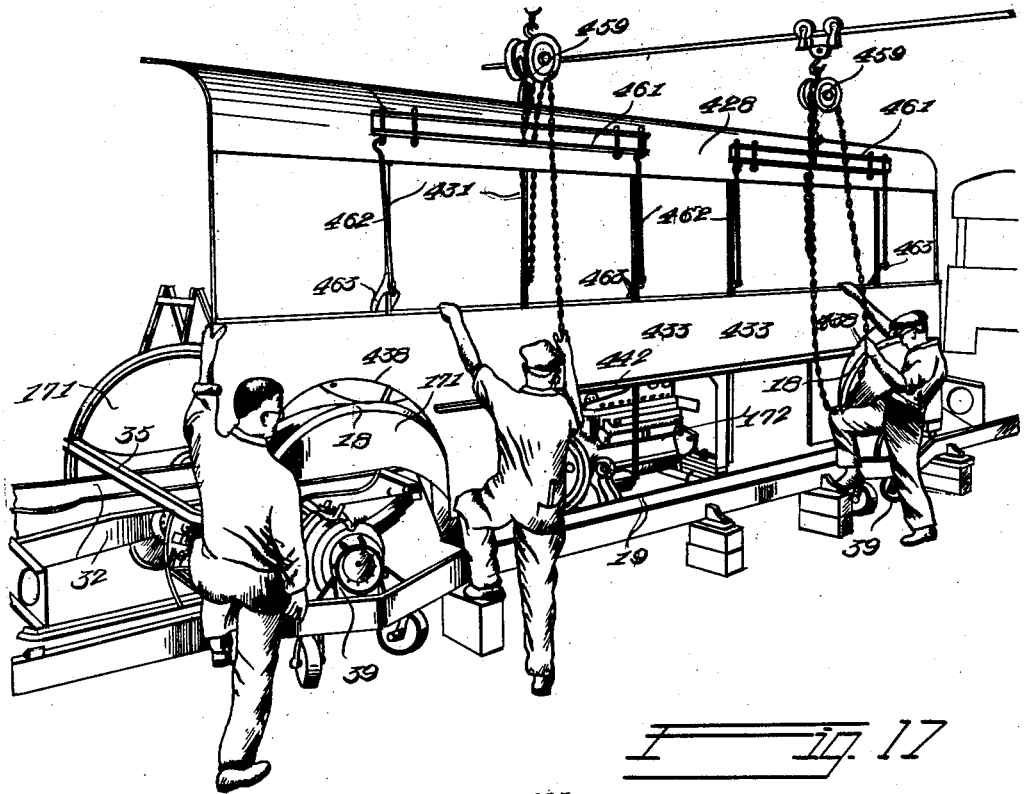
Figure 17 (sheet 11) is a perspective view disclosing my improved method of assembly of the coach body sides on the body frame after the motors, transmissions, controls, etc. have been assembled in the body frame work.

Figures 61 to 64 inclusive (sheet 22) are transverse sectional views of frame or rail members entering into the construction of the sash disclosed in Figures 58, 59 and 60.

Figure 65 (sheet 21) is a fragmental top plan view of one of the motors corresponding to Figure 37 (sheet 18) disclosing a modified form of carbureter air intake connection.

Figures 66 and 67 (sheet 21) are respectively an end and side elevational view of the air intake connection illustrated in Figure 65.

Referring to the drawings for a detailed disclosure of the invention in which like parts are designated by like reference characters and referring first to Figure 1, (sheet 1) in which 10 (Figure 1) designates a template that, as shown, supports in manufacture and conforms to shape and dimensions of the outer body frame construction 11 forming with longitudinal beams, the body frame construction supporting the various power, transmission and control devices and related parts as will more fully hereinafter appear. Template 10 essentially comprises curved end beams or channel members 12 each provided with a pair of vertically extending angle members 13 which adjacent the outer ends thereof are connected by a longitudinally disposed bar 14. Template 10 intermediate end beams 12 is provided at each side thereof with a pair of spaced arcuate sections 15 supported by suitable legs 16 which in turn support longitudinally alined frame supporting templet side members 17.

The outer body base frame structure 11 is constructed on template 10 by shaping suitable angle iron sections to the template form and welding the parts together. Said frame comprises two pairs of longitudinally aligned and transversely spaced arched wheel housing and fender frame members 18. Members 18 on each side of frame 11 are connected by a straight angle bar 19 welded thereto, and a pair of laterally spaced angle bars 21 extend outwardly from each pair of members 18 and have their ends curved inwardly to frame and outline the curved ends of the completed body construction. Bars 21 have their adjacent ends disposed in spaced relation and connected by lighter bars 22, and a vertically disposed angle bar 23 is welded to each end of curved bars 21. Welded to the upper ends of angle bars 23 are horizontally disposed angle bars 24 in vertically spaced relation to bars 22 forming the body framing for openings to tire receiving chambers.

The base frame construction 11 is the nucleus upon which is supported and constructed the various elements entering in to the completed vehicle body since frame construction 11 is constructed on template 10 which supports and accurately determines the correct position and relation of the different parts entering into the frame construction. Accurate construction of such frames with a minimum expenditure of time and labor, and minimum cost is provided as it will be seen that the expeditious assembling of the frame constructions may be carried out with accuracy by comparatively unskilled labor, the different parts thereof being bent to shape and clamped in position on the template by suitable clamps 25 in sections which are then welded together providing a primary frame construction of comparatively light weight forming the base structure for the vehicle body.

The frame construction 11 constructed as above set forth is temporarily provided with braces 26 for holding the different parts against relative displacement, and is then transferred by means of suitable cranes to a second template 27 (Figure 2, sheet 1) comprising essentially a rectangular angle bar supporting portion 28 provided with transverse bracing members and supporting members 29, and vertically disposed rectangular frame members 31 to which the longitudinally disposed channel bar frame supporting members 32 are clamped in proper relationship by suitable clamps 33. Frame construction 11 is supported on template 27 and channels 32 with members 18 in engagement with frame members 31. Suitable clamps 34 maintain frame 11 against movement relative to template 27 and channels 32.

Relatively light channel bars 35 are disposed on channels 32 transversely thereof and riveted thereto by suitable connecting gusset plates, and their ends are secured to frame sections 18 by apertured bracing gusset plates 36 riveted in position.

The base frame structure thus completed is released from template 27 by removing clamps 33 and 34, and is then transferred by suitable cranes or hoists to a suspended position at which time the front and rear axle and spring assemblies 37 and 38 respectively (Figure 3, sheet 2) are secured thereto as will now be described.

Axle constructions 37 and 38 as illustrated in Figures 3 and 4 (sheets 2 and 3) are supported by dollies 39 each of which comprises a pair of castors 41 swivelly connected to the opposite ends of a vertically disposed web member 42 which at the outer end thereof is provided with an arcuate portion or cradle recess 43 for receiving the respective end portions of the axle constructions, and at the base thereof is provided with a lateral flange 44 connected with web member 42 by integral triangular bracing members 45. Web member 42 adjacent recess 43 is provided with a plurality of apertures 46 for the reception of wheel securing bolts hereinafter referred to whereby upon the application of nuts to the wheel securing bolts, dollies 39 are rigidly secured in position to support and transport axle assemblies 37 and 38. The dirigible wheel mountings for the forwardly disposed steering wheels, are temporarily held in fixed relation with respect to each other and to the forward axle by removable struts interconnecting said mountings and any part carried by the axle so that said mountings are immovable while the axle is supported on the dollies. The shiftability of the wheels of the dollies is relied upon to facilitate movement in angularly disposed directions of the axles that have dirigible wheel mountings.

The axle and spring assemblies are each provided with a pair of dollies 39 in the manner above set forth and the axle assemblies are then manually pushed on the dollies to a position beneath the base frame structure in its above referred to suspended position. The frame structure is then lowered, and the spring and axle assemblies are connected to the base frame construction through the springs carried thereby in the manner hereinafter more fully set forth producing the assembled construction illustrated in Figure 3 ready to be moved along the assembly line to have the various parts progressively assembled on the frame structure in the manner shown in Figures 5 and 6, sheet 4.

The rear axle construction 38, in accordance with the invention, is a drive axle but may be of any desired construction. As indicated in Figure 7, sheet 6, each of said constructions preferably comprises a fixed or dead axle 47 of tubular form and slightly tapered at each of its opposite ends. A bracket 48 is provided with a tapered sleeve portion 49 fitting snugly on each tapered end of axle 47 and is secured thereto by means of rivets 51. A spring supporting pad 52 is formed on the sleeve 49 and supports the intermediate portion of a leaf spring structure 53 which is clamped to the pad by means of U-bolts 54. Each spring 53 supported by each of the pads 52 is pivotally secured at the forward end thereof by a pin 55 (Figure 3, sheet 2) to a bracket 56 secured to the frame channels 32, and at the rear end thereof, is pivotally secured by pin 57 to a shackle 58 which in turn is pivotally supported on a shackle bar 59 on the portion thereof between a nut 59' adjustably engaged therewith and a bracket 60 (Figure 3, sheet 2) which is secured to the adjacent member 32, and to which bar 59 is detachably secured, at 60'' in Figure 3.

Bar 59 extends substantially the full width of body frame 11 with the ends thereof terminating slightly inwardly of the outer edges of the laterally opposite angle bars 21 as indicated in said figure and in Figure 51, sheet #4. The opposite ends of bars 59 are detachably secured to the under faces of bars 21 by U-bolts 60ª (Figures 51 and 52, sheet #4) having the sight portions thereof engaging recesses or grooves 60ᵇ in the ends of bar 59. The legs thereof extend through and are secured to bars 21. The ends of bar 59 are maintained in slightly spaced relation to bars 21 by means of blocks 60ᶜ provided with seating surfaces conforming to the cylindrical surface of bar 59 and further provided with opposite recesses receiving the legs of U-bolts 60ª as is clearly indicated in Figures 51 and 52 sheet #4.

By the provision of the shackle bar 59 detachably secured to body frame 11 in the manner disclosed not only is a convenient spring shackle pivot supporting means provided but bar 59 additionally functions to provide an additional truss or strut for the body frame 11. It will of course be understood that a similar bar 59 is provided for the springs supported on axle assembly 37 hereinafter referred to.

Bracket 48 is formed with a recess or chamber 61 (Figure 7, sheet 6) to receive the driving mechanism for the drive axle 62. To the mouth of the recess 61 is secured by means of bolts 63 an outwardly projecting housing member 64. In the outer end of housing member or casting 64 is secured a bearing cage 65 in which are supported roller bearings 66 rotatably supporting the outer end of axle 62. The inner tapered end of axle 62 fits into a spider or hub member 67 and is keyed thereto as indicated at 68. Hub member 67 is provided with a tubular extension 69 journaled in roller bearing 71 suitably mounted in bracket 48. The inner end of axle 62 projects through hub member 67 and is threaded at 71 to receive a nut 72 which bears against a washer 73. Washer 73 in turn bears against tubular extension 69 of hub member 67. A hub cap 73' is fitted over the nut 72 and secured to bracket or casting 48 by bolts 74 thereby sealing the inner end of the housing. The opposite end of the housing is sealed by a flexible washer 75 bearing against axle 62 and confined in position by an annulus 76 secured to housing member 64 by means of bolts or screws 77.

Hub member 67 is formed with peripheral projections or lugs 78, and carries a spiral gear 79 formed with recesses 81 to receive lugs 78. Clamping plates 82 on opposite sides of the hub member are secured to gear 79 by means of rivets 83 thereby clamping the gear to the hub member. The spiral gear 79 is driven by a worm 84, located in recess 61. Worm 84 is carried on a drive shaft 85 suitably journaled in bearings located at the opposite sides of recess 61.

In the side of the housing member 64 is an opening 86 providing access to interior parts for adjustment thereof, which opening is normally closed by a suitable plate or other closure. A suitable port is provided at one side of bracket member 48 through which lubricant is admitted into housing 64 and recess 61, where it serves to lubricate the worm, spiral gear, bearings for drive shaft 85 and live axle 62.

Live axle 62 is provided on the outer end thereof with a flange 87 to which is secured as indicated in dotted lines a wheel construction 88. Such construction may be a dual construction, as illustrated, or any other wheel construction. Clamped between flange 87 and the wheel construction 88 is the central disk portion 89 of a brake drum 91. Double ended bolts 92 are used to fasten wheel 88 to flange 87 so that whenever it is desired to remove the brake drum it is only necessary to undo the nuts on the outer ends of bolts 92 and remove the wheel after which the brake drum can also be freely removed providing access to the parts housed thereby under normal conditions. This construction forms an important part of my invention.

Disposed within the brake drum and carried by housing member 64 are a pair of brake shoes 93 only one of which is shown in section, the brake shoes are pivoted at their lower ends on closely adjacent pins 94 only one of which is represented. Pins 94 are secured in bracket extensions 95 and 96 depending from housing 64. The pins 94 are centrally bored as indicated at 97 to admit oil or grease therein and from the central bore extend radial bores 98 leading to a bushing 99 in the pivot bore of the brake shoe. A grease cup 101 is provided at the inner end of each pin 94 through which lubricant may be forced into the bore 97 and through bores 98 to bushing 99. The brake shoes 93 at their upper ends are each provided with an anti-friction roller, which rollers are maintained by suitable springs against opposite sides of a substantially S-shaped cam member 102 fixed to the outer end of a shaft 103 rotatably journaled in a bearing 104 integral with housing member 64. Splined to the inner end of shaft 103 is a spiral gear 105, inwardly of which the shaft 103 is provided with a reduced extension 106 terminating in an oil pocket 107 defined by cooperating recesses in housing 64. Said pocket is supplied with oil from an oil reservoir 108 formed in housing 64. Rotatably mounted on hub section 105' of gear 105 is a housing 109 in which is suitably journaled a shaft 111 provided with a worm 112 in meshing engagement with gear 105. Shaft 111 is provided with a suitable angular head for engagement of a suitable tool whereby upon rotation of shaft 111 gear 105 may be rotated to impart a like rotation to cam member 102 to effect an adjustment of the brake shoes by moving the outer roller carrying ends thereof toward or away from the brake drum 91. It will be noted that by this means the brake shoes can be moved relative to the brake drum independently of housing 109.

Integral with housing 109 is an outwardly projecting arm 113 to which is secured by means of a bolt 114 the outer end of an arm 115 whose inner end is pivotally mounted on shaft 103 and an outwardly extending projection 116 of a yoke member 117 which yoke member is provided with an arm 118 provided with a spindle 119 rotatably journaled in a sleeve 121 secured within an aperture in bracket 48. Housing 109 is pivotally shiftable about the axis common to spindle 119 and shaft 103. In order to effect shifting of housing 109 the yoke member 117 is provided with a crank arm 122 to the outer end of which the end of a pneumatically actuated connecting rod 123 Figure 3 is pivotally secured, the opposite end of connecting rod 123 is connected with the pneumatic diaphragm housing 124 (Figures 3 and 5) in well known manner. Arm 122 may be actuated in any other approved manner, manually or otherwise.

The reservoir 108 is filled with lubricant through a plugged opening 125 and a wick 126 leads to oil pocket 107 from the oil reservoir 108. Shaft 103 is centrally bored for the reception of a wick 127 the inner end of which communicates with pocket 107. Said wick conveys lubricant through shaft 103 from which it flows by way of transverse bores 128 to the bearing 104.

The front axle construction 37 (Figure 5, sheet 4) comprises an axle 131 to the opposite ends of which are pivotally secured, by vertically disposed king pins, brake shoe supporting members 132 to which the front steering wheels 133 and the brake drums are detachably secured by a series of bolts in a manner similar to that in which the drive wheels 88 and brake drums 91 are secured to the members that connect these parts to the rear axle. It is these wheel securing bolts, projecting through the apertures 46 in web member 42 of dollies 39, that are utilized for holding the dollies in temporary assembled position for manual transportation of the axle constructions beneath the frame constructions and for moving the frame construction to and from the different assembling stations after the axle constructions are attached thereto. Other of these assembly stations will be hereinafter referred to.

As indicated in Figure 5 the brake mechanism for the front steering wheels is actuated by pneumatic diaphragms disposed in housings 134 similar to the housings 124 for the drive wheels all of which housings are in communication with a main pneumatic cylinder in well known manner.

The front axle 131 is yieldably connected with the frame by leaf spring assemblies 136 similar to spring assemblies 53 and connected in like manner, utilizing a shackle bar 59 to which the rear ends of springs 136 are shackled in the manner above described relative to drive axle 38. In Figure 8, sheet 7, is illustrated on an enlarged scale one of the spring assemblies 136. Axle 131 is shown in cross section adjacent the central portion of the spring 136 the axle being widened at the top thereof to provide spring seat or supporting pad 137 on which is supported a supporting plate 137' for supporting the intermediate portion of the spring in the same manner as pad 52 for spring 53. Each spring 136 is secured to pad 137 by U-bolts 138 whose bight portions rest in grooves in an outer spring engaging plate 139, nuts 141 being provided for tightly clamping the superposed leaves of spring 136 between pad 137 and plate 139. The leaves of spring 136 are further held in engagement intermediate U-bolts 138 by bolts 142 the outer ends of which rest in a recess 143 in plate 139. U-shaped clips 144 have the bight portions thereof secured to the opposite ends of one of the leaves of the spring and pins 145 extend through the outer ends of the legs of clips 144 free of the outer leaf of the spring for limiting separation of the leaves of the spring outwardly of the center connection thereof. The forward end of each spring 136 is pivotally connected at 147 to the bracket 56 provided with apertures 149 for attachment to adjacent longitudinal member 32, and the rear end of each spring 136 is pivotally secured at 151 to the shackle 58 in turn pivotally secured to shackle bar 59 which is detachably secured to bracket 60. Bracket 60 is provided with apertures 155 for the reception of securing elements for securing the bracket to the adjacent frame member 32. Each of the pivotal connections 147 and 151 is provided with a lubricating channel 150 as indicated, transverse bores extending from said channels to the bearing surfaces.

During the yielding action of each of the springs 136 as well as the similar springs 53 the individual leaves thereof undergo a relative sliding motion. Means are associated with each of the springs for yieldingly resisting this motion thus affording a more efficient and easier riding spring construction under severe conditions of service. Said means, illustrated in Figure 8, comprises preferably a supporting plate 157 disposed adjacent each end of the spring in spaced relation to the inner surfaces of the ends of the contiguous spring leaves, each plate being outwardly flanged at 158 providing a shallow receptacle in which the base of a rubber block 159 is snugly seated. The block 159 is of stepped formation in conformity to the contour of the adjacent spring leaf ends and is held in engagement with plate 157 and spring 136 by U-bolts 161 whose bight portions extend over the outer surface of the spring and whose legs extend through apertures in plate 157. Nuts 162 are secured for tightly clamping blocks 159 in position in firm yielding contact with a plurality of the spring leaves. As indicated each of the plates 157 is provided on the inner face thereof with reinforcing ribs 163. The ends of the spring leaves that are in engagement with blocks 159 may be provided with inwardly directed projections 164 for seating engagement in corresponding channels 165 in blocks 159 at the juncture of the stepped surfaces thereof, so as to yieldingly resist relative endwise movement of the spring leaves in both directions.

By this construction the spring leaves are yieldingly held from free relative movement without unduly restricting the action of the spring assemblies. An effective shock absorber and snubber is thus provided.

With the axle assemblies 37 and 38 connected with the frame construction through their spring assemblies 53 and 136, as above described, and with dollies 39 secured to the wheel securing bolts as illustrated in Figure 3 the entire base frame assembly is completed prior to transporting the base construction to further assembling stations later referred to.

In order to do this metallic wheel housings 171 are secured to arched members 18 and bars 35, as shown in Figure 3, by welding or otherwise, for a purpose later described, after which a pair of gasoline motors 172 are mounted on the frame on the outer sides of members 32 in transverse alinement and substantially midway of the length of the frame.

As clearly indicated in Figure 3, sheet #2 a channel bar 173 extends transversely of body frame 11 and is secured to the under sides of members 32 with the opposite ends thereof resting upon and secured to angle bars 19.

Extending transversely of body frame 11 in longitudinal spaced relation to bar 173 are a pair of laterally alined bracing bars 174 secured at opposite ends to the respective bars 19 and members 32 and provided at the opposite ends thereof with motor trunnion supporting brackets 175 and 175'. Each of the motors 172 is provided adjacent one end thereof with a pair of laterally extending and transversely alined trunnions 172' each removably and rockably mounted in a bore 172'' in a rubber insulating or cushioning block 172ª. Said blocks are each seated in curved seats in the respective brackets 175 and 175', and the blocks 172ª are maintained in position by means of semi-circular caps 172ᵇ detachably secured to brackets 175 and 175' by means of U-bolts 172ᶜ (Figure 53, sheet 21).

Each of the motors 172 at the end thereof opposite to the end provided with trunnions 172' is provided with a lug 174' (Figure 54, sheet #21) comprising a horizontal extension 174'' provided with an aperture 174ª. Extension 174'' is yieldably supported on channel bar 173 by means of a pair of centrally apertured rubber cushioning blocks 174ᵇ disposed between extension 174'' and bar 173. A rubber cushioning block 174ᶜ is inserted in aperture 174ª and is provided with an aperture in vertical alinement with the aperture in corresponding block 174ᵇ. A rubber insulating block 174ᵈ is supported on extension 174" above each of the blocks 174ᵇ and is provided with an aperture in vertical alinement with the apertures in the respective blocks 174ᵇ and 174ᶜ. A bolt 175ᵃ is projected through the alined apertures in each set of rubber insulating blocks with one end thereof extending through a metallic washer 175ᵇ and the other end thereof projecting through channel bar 173 as clearly indicated in Figure 54, the bolts being provided with nuts 175ᶜ upon turning up of which the rubber insulating blocks are put under compression and drawn into firm contact with extension 174" and bar 173.

By the provision of the motor mounting means as disclosed, vibrations occasioned by the motors are absorbed by the rubber blocks and thus prevented, in great measure, from being transmitted to the vehicle body minimizing vibrations in the body due to the impulses of the several motors.

It will further be noted that, as indicated in Figure 5, sheet #4, the motors are substantially provided with a three point support, thus providing a construction in which the motor is certain to be immovably supported in spite of any slight inaccuracies in cross member 173. It will be understood that the motor may swing about the trunnion 172' until its third point of support engages said cross member. It accordingly is an extremely simple matter to initially install, and replace after removal, either of the motors. The resilient cushions on which the motors are mounted automatically firmly seat themselves in spite of any slight inaccuracies in the motor supports.

The oppositely positioned motors 172 are maintained in substantially permanently relative spaced relation by means of an adjustable tie rod 175ᵈ (Figure 5, sheet #4 and Figure 55, sheet #21) comprising a pair of sections 175ᵉ whose adjacent ends are adjustably connected by a turn buckle member 175ᶠ and whose opposite ends are pivotally secured to brackets 175ᵍ rigidly secured to the bell housings of motors 172. The turn buckle 175ᶠ permits the ready separation of the sections 175ᵉ when it is desired to remove either motor, and at the same time proper adjustment thereof will serve to firmly space the heavy motors, thus relieving the box-like body by which said motors are carried from unnecessary strains, and in particularly resisting any tendency of the members 175 and the frame members 19 to bend laterally whenever the vehicle rounds a curve at high speed.

Mounted directly in front of each of the motors 172 (Figure 5, sheet 4) is a radiator 176 one of which is illustrated in detail in Figures 9 and 10 (sheet 8). As shown each radiator construction comprises a bottom casting member 177 hollow in form and secured to a plate 178 by bolts 179 extending through plate 178, spacing blocks 181 and threaded into inserts 182 in casting member 177. One end of plate 178 is provided with a flange 183 secured as by welding or otherwise, to the adjacent frame member 32. The opposite end of plate 178 is provided with a flange 184 secured to member 19 of frame 11. An opening 185 is provided in casting 177 for the motor crank shaft. A pipe connection 188 is in communication with the bottom of casting 177 for putting it in communication with the engine jacket. A drain cock 187 is also provided for casting 177. A tubular hose connection 188 is secured to casting 177 so as to be in communication therewith. One end of the lower hose 189 is detachably secured by clip 191 to said connection, the opposite end of the hose being detachably connected with the water pump. Secured to casting 177 in communication therewith is the cellular body 192 which at the upper end thereof supports and is in communication with a hollow header 193, likewise provided with a tubular hose connection 194 to which one end of the upper hose 195 is detachably secured by clip 196, the opposite end of the hose being detachably secured to a tubular member that is in communication with the motor water jacket in any well known manner. Each flexible hose 189 and 195 has inserted therein a helical spring 197 to prevent partial collapsing of the hose due to the suction created by the water circulation.

Header 193 is provided with a filling inlet connection 198 extending through a side wall of the body hereinafter described and provided with a closing cap 199. Header 193 opposite connection 198 is provided with a connection 200 from which extends an overflow pipe 201.

A cooling fan 204, Figure 5, is disposed between each motor 172 and the associated radiator 176. Each fan is driven by the motor in the usual manner for drawing air through the cellular body for cooling the circulating water in a manner later referred to.

A shaft 205 is connected to the forward end of the crank shaft of each of the motors 172 and one of the shafts 205 is connected by a flexible coupling 206 to a generator 207 for charging the storage batteries 208, which supply current for lighting purposes and for starting the motor. The other shaft 205 is connected through a flexible coupling 209 to an air compressor 211 for compressing air in suitable tanks for utilization in the operation of the above described pneumatic diaphragm brake housings 124 and 134.

The rear end of each of the motors 172 is provided with a speed change gearing or transmission 213 of the selective sliding gear type. The gears are manipulated by a shift finger operable by a shaft 214, the shafts 214 of the opposite transmissions at adjacent ends being connected by flexible connections 215 to the opposite ends of a transversely disposed shaft 216, suitably journaled for rotation from frame members 32. One end of an actuating rod 217 is secured to an arm on shaft 216, the opposite or forward end of rod 217 being operatively connected with the gear shift lever 218.

Each of the transmissions 213 is provided with a clutch of any suitable type, each of which is mounted on a shaft within the transmission housing in usual manner. The present invention includes novel means for effecting simultaneous movement of the clutches. Such means is illustrated in detail in Figures 11 and 12 (sheet 9). Each of the clutch shafts 219 projects inwardly of the transmission housing toward and into proximity to the respective base frame member 32. Keyed to the end of each of the shafts 219 is a downwardly projecting lever arm 221 having an inwardly directed angular extension 222 provided with an adjusting screw 223. Secured to the inner face of one of the members 32 as indicated at 224 is a bearing block 225 provided with a bearing sleeve 226 whose inner bore is in alinement with an aperture 227 in member 32. A lubricating fitting 225' is threaded into block 225 for lubricating shaft 228. Journaled in sleeve 226 is one end of a shaft 228 which is maintained against longitudinal movement by collars 229 bearing against washers 231 which in turn bear against the respective opposite faces of member 32 and block 225, the collars 229 being held against movement longitudinally of shaft 228 by set screws 232 and lock nuts 233. The opposite end of shaft 228 is rotatably journaled in a tubular member 235 provided with a lubricating fitting 235'. The outer end of said member is rotatably journaled in a bearing sleeve 236 supported within a bearing block 237 secured to the opposite frame member 32 as indicated at 238 and provided with a lubricating fitting 237'. The tubular member 235 projects beyond the outer face of the adjacent frame member 32 and is surrounded by a washer 239 in engagement with member 32 which washer is engaged by a collar 241 surrounding tubular member 235 and secured thereto by a set screw 242 and lock nut 243 thus preventing inward movement of tubular member 235. Extending within the projecting end of tubular member 235 is one end of a stub shaft 245 which is secured to the tubular member in any suitable way, as by a rivet 246. Tubular member 235 is maintained against longitudinal movement in the opposite or inward direction by the hub 247 of an arm 248 which hub is keyed to shaft 228 and in engagement with a washer 249 in bearing engagement with the end of member 235. Keyed to tubular member 235 in spaced relation to arm 248 is the hub 251 of a second arm 252, hub 251 being spaced from block 237 by a washer 250. Keyed to the outer end of shaft 228 and stub shaft 245 respectively are inwardly projecting levers or arms 253 provided with screw engaging pads 254 for contact with the ends of adjusting screws 223 for effecting adjustment of the respective clutches through their shafts 219.

Each of the arms 248 and 252 is provided with an eye 255. Each of the arms are positioned between alined eyes 256 on each end of an equalizer bar 257, the eyes 255 on said arms being alined and pivotally secured together by pintles 258. The bar 257 intermediate the ends thereof is provided with an aperture 259 for the reception of a pivot pin 261 which also extends through the arms of a clevis 262 in which is adjustably threaded one end of an actuating rod section 263 which is locked in position by a nut 264. The opposite end of section 263 is adjustably threaded in one end of a connector 265 pivotally connected intermediate its ends, at 266, to the outer end of an arm 267 whose inner end is keyed to a bearing sleeve 268 for rotatable mounting on a shaft extending between and transversely of frame members 32. Adjustably threaded in the opposite end of connector 265 and locked therein by a nut 269 is one end of a second actuating rod section 271 whose opposite end is adjustably threaded in a clevis 272 and locked by a nut 273. Clevis 272 is pivotally secured at 274 to the outer end of an arm 275 of a clutch pedal 276 pivotally secured to a rod 277 supported on the body base frame.

By this construction limited independent rotative movement of arms 248 and 252 about pivotal connection 261 is permitted whereby the movement of the actuating rod is equalized on the two clutches providing for a further movement of one of the clutches to effect complete declutching in case the other clutch is released prior thereto.

The drive shaft 278 of each of the motors 172 rearwardly of the transmission housing 213 has keyed thereto an external brake drum 279 with which is associated novel braking mechanism illustrated in detail in Figures 13 and 14 (sheet 7). Upon reference to these figures it will be seen that each drum has pivotally secured thereto at 281 the adjacent ends of brake shoes 282 of arcuate formation, each of which comprises a curved base portion 283 having integral external reinforcing ribs 284, which ribs at the free ends of the brake shoes merge into flanges 285 integral with bases 283. Each of the brake shoes 282 has suitably secured to the inner surface of the base 283 thereof a suitable brake lining 286 for frictional engagement with drum 279 upon application of the brakes. The flanges 285 of each pair of brake shoes are provided with apertures 287 which as indicated in Figure 14 are out of vertical alinement or, more accurately, the aperture of one flange is disposed adjacent one side of the center thereof while the aperture in opposite flange is disposed equidistantly from said center, but on the opposite side thereof. Projecting through each of said apertures 287 is a bolt 288 whose head end is in the form of a clevis 289, the clevises of opposite bolts being arranged in spaced position, as is clearly indicated in Figure 14. Surrounding the shank of each bolt 288 is a coil spring 291 whose inner end engages clevis 289 and whose outer end engages a washer 292 movably disposed on the shank of bolt 288 and maintained in engagement with flange 285 by the expansive action of spring 291. A nut 293 is threadedly engaged with the outer end of each of the bolts in bearing engagement with the outer face of the respective flange 285. Disposed within the several clevises 289 are the opposite ends of a lever 294, which ends are provided with apertures in alinement with similar apertures in clevices 289. Said ends are pivotally secured to said clevises, by means of pins 295 extending through said alined apertures and maintained in position by cotters 296. Lever 294 intermediate the ends thereof is integral with, or suitably secured to, one end of a stub shaft 297 the oposite end of which has suitably keyed thereto an arm 298 provided with a screw engaging pad 299. Extending transversely of frame 11 and suitably supported by members 32 is a shaft 301 disposed in longitudinal alinement with stub shafts 297 and with the opposite ends thereof closely adjacent the free ends of shafts 297. Keyed to each end of shaft 301 is an arm 302, which, as indicated in Figure 13, is bowed outward at the outer end thereof in lapping relation to the respective pad 299. Each arm 302 at the outer end thereof is provided with a tap 303 in which is adjustably threaded a set bolt 304 with the end thereof in engagement with pad 299. Keyed to shaft 301 intermediate the ends thereof is an arm 305 to which is detachably secured one end of a straight actuating rod 306 whose opposite end is directly connected with emergency brake lever 307.

By the provision of the brake mechanism just described the brake shoes cooperating with each brake drum are capable of adjustment upon turning nuts 293 in one direction or the other thereby drawing the brake shoes into closer or further spaced relation to the brake drums, it being noted that the nuts are provided with projections normally held in depressions in flanges 285 by springs 291 thus avoiding inadvertent turning of the nuts. Further relative adjustment or equalizing of the oppositely disposed brakes is effected by turning set bolts 304 whereby one brake structure can be adjusted independently of the other for equalizing the braking action on the opposite brake drums upon rotation of shaft 301 through arm 305.

It will be seen from the foregoing disclosure that six brakes are provided, a pneumatically operated brake for each of the four wheels and the two manually operated emergency brakes for the drive shafts of the motors above described thus insuring sufficient braking facilities to meet any emergency condition.

The present invention includes novel fuel feed or carburetor control mechanism, indicated generally in Figure 5 and illustrated in detail in Figures 15 and 16 (sheet 10) in which a shaft 308, disposed transversely of members 32 and suitably supported thereby for rotation is utilized to effect said control. Shaft 308 has keyed thereto intermediate its ends a downwardly extending lever 309 to the inner end of which is pivotally secured at 311 a connecting member 312, in the opposite end of which is threaded one end of a rod 313, which is movably disposed in a guide 314 of a bracket 315 suitably secured to frame 11. The opposite end of rod 313 is threaded into one end of a connector 316 whose opposite end is pivotally secured at 317 to the inner end of a swinging arm 318 pivotally mounted at the outer end thereof on a rod 319 supported by brackets 321 suitably secured to frame 11. Pivotally secured to the inner end of arm 318 by a pivot 322 in alinement with pivot 317 is one end of a connector 323 into whose opposite end is threaded one end of a rod 324, the intermediate portion of which is slidably disposed in a guide 325 of a bracket 326 suitably secured to frame 11. The opposite end of rod 324 is threaded into one end of a connector 327 whose opposite end is pivotally secured at 328 to the inner end of a rocking arm 329, whose outer end is pivotally supported on a rod 331 supported by brackets 332 suitably secured to frame 11. The successive connectors and rods so far described are normally in longitudinal alinement and horizontally disposed. Pivotally supported from brackets 333 suitably secured to the frame is the intermediate portion of a lever 334. Pivotally secured at one end thereof to arm 329, as at 335, is one end of a connector 336 and pivotally secured at one end thereof to the adjacent end of lever 334 as at 337 is a similar connector 338. Interposed between connectors 336 and 338 and detachably secured thereto by having the opposite ends threaded into the adjacent ends thereof is an adjusting rod 339. Pivotally connected at 341 to the opposite end of lever 334 is one end of a connector 342 into whose opposite end is threaded one end of a rod 343 whose opposite end is threaded into the adjacent end of a connector 344 whose opposite end is pivotally connected at 345 to the inner end of an arm 346 pivotally mounted at its outer end at 347. An accelerator pedal 348 is connected to arm 346 immediately in front of a suitable foot rest 349 secured to a floor board of the coach.

Shaft 308 is journaled for rotation in bearings 351 carried by brackets 352 suitably secured to the frame whereby upon foot pressure on pedal 348 lever 334 is moved counterclockwise which through the various connectors, rods and rocking arms imparts counterclockwise movement to arm 309 and consequently shaft 308. Keyed to shaft 308 adjacent each opposite end thereof is an arm 354, one adjacent the carburetor of each motor. Pivotally secured at 355 to the outer end of each arm 354 is one end of a connector 356 into whose opposite end is detachably threaded one end of a rod 357. Rod 357 passes loosely through a block 358 pivotally connected at 359 to the carburetor operating lever 361 which lever is detachably secured to shaft 362. A nut 363 is engaged with the threaded outer end of rod 357 and a coil spring 364 surrounds rod 357 with one end thereof in engagement with a stop 365 secured to rod 357 and the opposite end thereof in engagement with block 358 normally maintaining nut 363 in contact with block 358 and pedal 348 in normal retracted or inoperative position.

Upon rotation of shaft 308 in the manner above referred to, arms 354 will both be rotated at the same rate and to the same extent effecting like movements to rods 357 which through springs 364 impart movement to carburetor levers 361.

In accordance with the construction disclosed while both rods 357 are simultaneously moved to the same extent there is the possibility of a variance in the throw of levers 361 to the full opening of the opposite carburetors and there is also a possibility, through inaccurate adjustment, of one or both rods 357 traveling a distance greater than the throw of lever 361. In this event the rods 357 move freely through blocks 358 and are thus independent of the throw of levers 361. Consequently the levers 361 of both carburetors will be yieldably but firmly moved through springs 364. Because of this construction, there is no possibility of one carburetor being only partially open if the other carburetor has already been completely opened and no disrupting or bending strains are put on arms 361 even though the movement of one or both rods 357 is greater than the normal throw of levers 361. Instead of the flexible, sectional operating rod disclosed interconnecting lever 309 and arm 346 a substantially straight one piece rod may be substituted therefor and movably mounted in suitable guides similar to those disclosed.

As indicated in Figure 5 each motor 172 is provided with an exhaust pipe 371 having incorporated therein a muffler 372.

As indicated in Figures 5A and 5B (sheet 4) the mufflers 372 may be shielded from the floor of the body by means of a metallic channel member 373, omitted in Figure 5. The base or bottom 374 of said member is disposed outwardly with the outer face thereof substantially flush with the outer surfaces of frame members 32. And the opposite sides or flanges 375 of said member 373 are disposed parallel with members 32 inwardly thereof as indicated in Figure 5A. The inner edges of said flanges are bent upon themselves and turned outwardly in contacting relation, as indicated at 376, for reinforcing or stiffening said inner edges.

Extending transversely of channel member 373 at each end thereof and spot welded to the outer surface thereof is a strap 378 having its ends split to form branch extensions 379 and 381 at each end. Extensions 379 extend inwardly in contact with the outer surfaces of flanges 375 with the inner ends thereof riveted to the inner reinforced edges of flanges 375 and to the outer ends of vertical legs 382 of U-shaped straps 383 as indicated at 384. Extensions 381 extend outwardly and have the angular ends thereof riveted to the inner faces of members 32 as at 385. The other or outer vertical legs 386 of straps 383 are riveted to the outer faces of member 32 as indicated at 388.

The body floor hereinafter described is supported on transversely extending sills, some of which are entirely of wood as indicated at 389 in Figure 5B. Said wooden strips, above said member 373, are provided on the opposite sides and bottom with a layer of asbestos or similar material 391 for preventing ignition of the wooden sill due to contact with member 373 which becomes relatively hot due to the heated exhaust gases passing through mufflers 372. In order to further reinforce member 373 it is preferably provided with transversely extending inwardly pressed channels or corrugations as indicated at 392.

By the provision of the muffler shield disclosed, the exhaust gas heat radiated by mufflers 372 is in a large measure prevented from reaching the flooring supported on frame members 35 and sill 389 thus eliminating danger of the fire from this source.

In Figure 5C (sheet 5) is illustrated in detail the manner of supporting the muffler and the conduits leading thereto and therefrom, comprising a rubber insulated muffler suspension connection in which the exhaust pipes 371 are each supported in a pair of strap iron brackets 393 one adjacent each frame member 35 as indicated. It will be understood that these brackets are attached to the frame at points beyond the muffler shield 373 just described. Each bracket 393 is provided with an angularly turned flat outer end portion 394 between which and the adjacent member 35 is disposed a thermoid rubber insulator 395 which is secured in position by bolts 396 extending therethrough as well as portion 394 and the adjacent vertical wall of member 35.

By the provision of the rubber insulated muffler suspension vibrations of explosions are absorbed and thus prevented from transmission to the body. The thermoid rubber is not affected by heat but possesses the desirable yieldable characteristics of the common form of rubber and consequently is well adapted for this particular use.

A gas tank 397 is disposed beneath frame 11 centrally thereof and suitably secured thereto. A filler pipe 398 has the inner end thereof secured to a fitting 398' suitably secured to tank 397 which fitting is provided with a vent connection 398''. The filler pipe 398 extends from tank 397 laterally outward as well as upward and has the outer end thereof detachably secured within the internally threaded nozzle 399 of a filler member 400 shown in applied position in Figure 50, sheet #6 and in detail in Figures 56 and 57, sheet #21. Filler member 400 consists of a box like casting comprising a substantially elliptical flange 400' adapted for attachment to a body side by means of suitable securing elements extended through apertures 400'' in flange 400' and an inwardly extending portion 401 integral with flange 400' defining a valve compartment 401' with which nozzle 399 is in communication and which nozzle is integral with the inner wall of portion 401.

Nozzle 399 is provided with a vent connection 399' which is placed in communication with vent connection 398'' through a suitable pipe having the opposite ends thereof detachably secured to said connections.

A flange 402 coextensive with nozzle 399 is formed integral with the inner wall of portion 401' in circumscribing relation to the opening in the inner wall in communication with nozzle 399 defining a valve seat. Formed integral or otherwise on said inner wall adjacent flange 402 is a pair of spaced apertured ears 402' between which one end of a valve actuating handle 402'' is pivotally secured by means of a pintle 402$^a$. Pivotally secured to handle 402'' intermediate the ends thereof, as indicated at 402$^b$, is a valve member 402$^c$ comprising a cup portion 402$^d$ in which is detachably secured by means of a screw 402$^e$ a sealing washer 402$^f$ for sealing engagement with valve seat 402.

Valve member 402$^c$ is normally maintained closed by means of a spring 402$^g$ having one end thereof suitably secured to ears 402' and the opposite end engaged over handle 402'' normally urging the handle downward, as shown in Figure 56.

With the construction shown, gasoline can readily be admitted to tank 397 by raising handle 402'' to disengage valve 402$^c$ from seat 402 to permit insertion of the hose nozzle in- to nozzle 399 and it is to be particularly noted that nozzle 399 is disposed at such an angle to portion 401 that no obstruction is presented to the ready admission of the hose nozzle thus providing a construction facilitating the handling of the hose nozzle. During filling operations the tank will be properly vented through connections 398'' and 399' and the connected pipe and immediately upon removal of the hose nozzle valve 402$^c$ will automatically close thus minimizing any fire hazards.

While the filling connections are indicated at one side of the body only, it will be obvious that a filling member 400 may be positioned at each side of the body whereby gas can be admitted from either side.

The front wheels 133 are pivotally mounted for steering movement, the opposite wheels being connected by an adjustable rod 403 for maintaining wheels 133 in parallelism and steering movement of wheels 133 is effected by a drag link 404 adjustably connected at one end thereof to a knuckle of an arm 406 and at the opposite end thereof operatively connected for movement through steering wheel 407.

Each motor shaft 278 is connected by a propeller shaft 409, each including a pair of suitable universal joints 411, to the worm drive shaft 85 whereby power is transmitted from motors 172 to the rear wheels 88 by means of the mechanism heretofore described. The wheels on opposite sides of the coach are accordingly separately driven, each by one of the motors 172. No differential is needed in view of this arrangement.

In Figures 5—D and 5—E sheet 5 is illustrated a metal floor board and accelerator assembly forming a part of my invention. Said board comprises a metallic base member 413 which in assembled position is slightly upwardly and forwardly inclined as indicated in Figure 5—E. Said member 413 is formed to provide an inclined foot engaging surface 415, constituting the back of an inwardly opening channel 416 preferably provided with integrally connected outstanding flanges and an upward extension or flange 414, as clearly illustrated in Figure 5—E.

The emergency brake lever 307 for operating brakes 279 is pivotally connected at 417 adjacent the right hand edge of plate 413 such that brake rod 306 will be directly pivotally connected to the short arm 418 thereof in order to provide a direct forward pull on rod 306. Immediately to the left of brake lever 307 is the accelerator pedal 348 and the adjacent foot rest 349. Substantially centrally of the floor board is a removable plate 421 through which projects substantially centrally thereof a steering post boot 422 and oppositely disposed foot lever boots 423, one for the clutch lever and the other for the brake lever. To the left of plate 421 are switch operating buttons 424 for operating left and right turn visible signals, and a further button 425 is provided for dimming the headlights. The forward or outer surface of extension 414 has suitably secured thereto a strip of felt 426 for vibration absorbing purposes. The starting motors 172 are each provided with a magnetic coil which coils are simultaneously magnetized by means of a push button on the instrument board.

The base of the body frame construction is provided with the various mechanisms heretofore described, as well as any necessary additional essential parts not referred to, successively. When completed said frame may then be manually transported on dollies 39 to an assembling station, indicated in Figures 17 and 18 (sheet 11), where the superstructure, comprising the sides, ends and top, is assembled with the completed base frame construction.

Prior to the assembling of the sides, ends and top with the base construction the parts just referred to are constructed in sections or units after the manner clearly indicated in Figure 19 (sheet 3), wherein it will be seen that the body sides 428 are constructed on a template 429 which accurately determines the position and dimensions of the various parts entering into the construction of sides 428.

Each side 428 as illustrated in Figure 19, comprises a plurality of vertically disposed and longitudinally spaced bars 431 whose upper ends are bowed as indicated at 432. The lower ends of bars 431 have an outer covering 433 riveted thereto which cover, as illustrated in Figure 20, preferably is of a laminated construction comprising inner and outer or opposite layers of thin metal 434 between which are preferably three thin veneer wood layers 435, all of the layers being firmly riveted together as indicated at 436 thus providing a strong, as well as a good heat insulating covering. Upon riveting through the opposite layers 434 the intermediate wood layers 435 are compressed thus setting up an outward reacting pressure which binds the rivet heads tight against layers 434. The construction of the covering though comprising a plurality of layers is comparatively thin and yet sufficiently light and strong for the purpose for which it is intended. Furthermore, the covering is such that in case the coach should be involved in a collision it will yield and bend in a manner providing a substantial cushioning action bringing it to a stop thereby avoiding the imparting of the full impact to passengers within the body. As a consequence a coach whose body is covered with such material will upon collision gradually bend and yield to the impact thus avoiding serious injury to passengers. The bars or frame members to which covering is secured are relatively light structural members, that can bend rather than break in case of accidental collision, and in bending serve to gradually bring the coach to a stop lessening the shock of the impact. Covering 433 is provided with arcuate cutouts 438 and an intermediate rectangular cutout 439. Suitable reinforcing and finishing strips 441 are riveted to bars 431 and longitudinally disposed metallic finishing strips 442 may also be riveted to covering 433.

A transversely arcuate covering 444 of the same construction as covering 433 is riveted to the upper curved ends 432 of bars 431 to form the opposite outer curved eaves portions of the roof of the body construction.

At the side, end and roof assembling station represented in Figure 19 a plurality of body sides are constructed in readiness for assembly with body base frame constructions which have been assembled at other assembling stations in the manner hereinbefore set forth, and it will be noted upon reference to Figure 19 that the body sides are constructed on opposite sides of template 429 in pairs in substantially the same relative position that they occupy when assembled with the base of the body.

As indicated in the same figure, the body ends 446 are constructed in opposing pairs on suitable templates 447, which templates, as indicated, are of skeleton formation and serve to accurately determine the position and dimension of the different parts entering into the end construction thus greatly facilitating the construction of the ends with extreme accuracy.

Each end 446 comprises a plurality of vertically disposed spaced bars 448 provided with outer curved or arched ends. Bars 451 project from several ends, being attached adjacent the bases of curved ends 446, and connected to bars 448 thereof by welding or riveting. The inner ends of curved transverse roof bars or carlines 452 are riveted or welded to bars 451. A covering 453 of laminated construction similar to covering 433 is riveted to bars 448 adjacent the inner ends thereof and is provided with a rectangular cutout 454 for a purpose later described. The end constructions are united with the portion of the roof covering the ends of the body, said portions of the roof extending over the doors provided at each end of the body.

A covering 456 of like laminated construction is riveted to curved ends of bars 440 and to carlines 452. In order to facilitate assembling said covering is preferably applied in sections as indicated. Covering 456 may be provided with a rectangular cutout as indicated at 457 for a purpose later described.

The base frame for the body construction, upon completion at the assembling station indicated in Figure 3, as above described are successively transported by means of dollies 39 to a side, end and roof assembling station, indicated in Figure 17 (sheet 11), at which station sides 428 are assembled by transporting the sides in succession from the side constructing station above referred to by suitable conveyers 459 into proximity to the opposite sides of the base frame construction as indicated in said figure. In order to facilitate the handling and transportation of sides 428 and avoid marring of the surfaces thereof suitable channel or similar bars 461 flexibly attached to the outer ends of rods 462 having hooks 463 on the inner ends thereof are provided. Said hooks are adapted for engagement with bars 431 adjacent the outer edge of covering 433. The sides 428 are gradually lowered from their suspended positions indicated into proper alinement with the body base frame 11 so as to bring about the alinement of cutouts 438 with arched members 18 and the inner edge of covering 433 with bar 19 whereupon the side is securely riveted or otherwise secured to bar 19 and members 18 adjacent the inner margin of covering 433.

After a pair of sides 428 have been assembled with the base frame, ends 446 are transported in like manner and lowered into proper relative position and secured in position by riveting the lower ends thereof to bars 21 as well as to the adjacent ends of sides 428.

Figure 18:
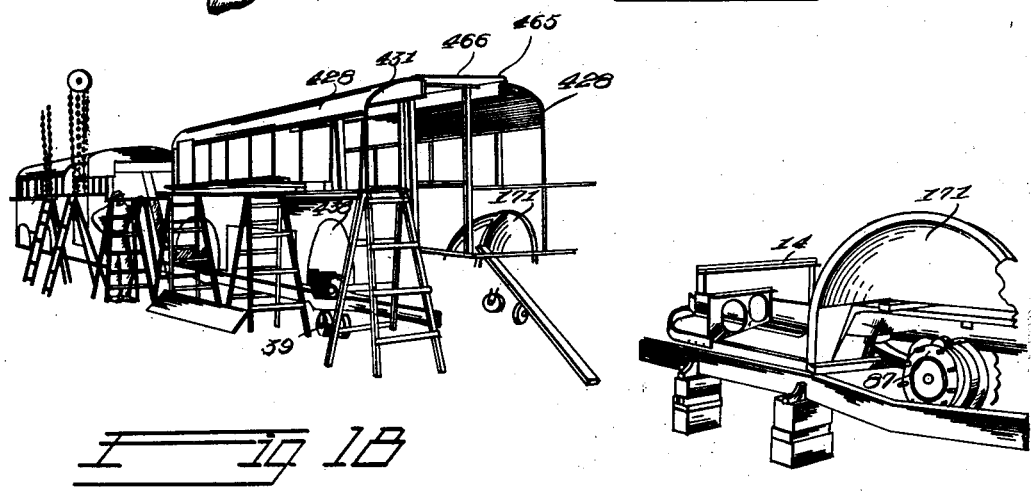
Figure 18 (sheet 11) is a perspective view of a plurality of assembly stations with separately formed body side, end and roof sections being assembled on the body frames.

It will be noted upon reference to Figure 18 that the adjacent ends of bars 431 of oppositely disposed sides 428 do not contact but are in substantial spaced relation which with the opposite roof sections carried by the ends define a rectangular opening 465 which opening is closed by a roof section 466 preferably constructed separately as a unit, and secured in position by riveting or welding the marginal edge thereof to the adjacent edges of sides 428 and ends 446. Said section may include a frame of suitably arranged carlines and purlines covered with laminated material of the character above described.

It will be seen that at this assembly station the body sides, ends and roof are completely assembled with the body base construction. Said assembly is then conveyed by dollies 39 to a subsequent assembling station indicated in Figures 25 and 26, (sheets 13 and 14) where they are provided with the final external parts such as destination signaling devices 468 visible through the aforementioned cutouts 457, which signaling devices may be of any approved type and are built in as a part of the body. Also at this station the bodies are provided with head lights 469, ventilators 471 and 472, visors 473 and a bumper 474 on each end of the body. As indicated in said figures each bumper 474 comprises opposite end bars 475 between the adjacent ends of which is disposed a section 476 that may be pivotally connected to one of the bars 475 or connected thereto in any suitable manner. The cutout 454 in each end 446 has secured to the margin thereof a reinforcing strip 477 defining an opening in alinement with swingingly mounted bumper section 476. Said opening is in communication with a compartment 479 disposed beneath the floor having a slat bottom 480 (Figure 5, sheet 4) adapted to receive spare tires which tires contact with section 476 thus providing a yieldable backing for section 476 upon impact.

It will accordingly be seen that a substantial compartment 479 is provided beneath the floor at each end of the body, each of sufficient dimensions to accommodate at least two spare tires and that the hinged bumper section 476 functions as a door for each compartment 479 for maintaining the spare tires therein and that the spare tires engage the pivoted bumper section 476 providing a yieldable backing therefor thus assisting the bumper section 476 in responding to impacts thereagainst. While compartments 479 are disclosed as provided with slatted bottoms 480 for the support of spare tires, it is obvious that a continuous floor may be provided in one or both compartments 479 making same suitable for the transportation of articles other than spare tires.

Ventilators 472 as indicated in Figure 26 are disposed below the end windows or shields and may be operated in any desirable manner for regulating the admission of air therethrough. The openings controlled by ventilators 472 are preferably covered with fine mesh screen to prevent dirt and insects entering the coach body.

Ventilators 471, as more clearly indicated in Figure 25A (sheet 13) are disposed above the end windows and beneath visor 473 for admitting air currents above the passenger's heads. Said currents are controlled by ventilator 471, in the form of a door 480 hinged at 481, the extent of opening of which is regulated by a screw 482 threadedly adjustable in a suitable support 482'.

Thus by manual manipulation of screw 482 door 480 can be swung on its hinge 481 to effect the desired opening for most effective ventilation. The opening controlled by door 480 is preferably covered by a fine mesh screen to prevent dirt and insects from being blown into the coach body.

As indicated in Figures 26 and 50 each cutout 439 in covering 433 is closed by a detachable plate 483 provided with a series of forwardly opening louvers 484 and a series of rearwardly opening louvers 485 for a purpose later described.

The body is now provided with a flooring 486 (Figure 45 sheet 15) and upon reference to Figures 6 and 50 it will be noted that the flooring which is supported on suitable wood sills secured to various of the transverse members of frame construction 11 is disposed above all of the operating elements supported by frame 11 with the exception of wheel housings 171 and motors 172 with their associated radiators 176 which project above flooring 486. Some of the seats later described are assembled over the wheel housings and motors. It will be noted upon reference to Figures 6 and 50 that the lower edges of sides 428 and ends 446 project below flooring 486 such as to substantially conceal all parts carried by frame 11 thus presenting a body of neat external appearance. As indicated in Figure 45 (sheet 15) flooring 486 comprises a base 487 of suitable composition on which linoleum 488 is laid.

The opposing edges of side coverings 433 and 444 together with spaced vertical bars 431 define a series of rectangular openings 489 in each of which is disposed a window assembly 491, the construction of which is illustrated in detail in Figures 27 and 28 (sheet 15) wherein it will be seen that bars 431 between adjacent windows are of substantially T-shape, each comprising a base member 493 and an intermediate right angular flange member 494. Disposed on each side of member 494 is a retaining strip 495 of thin sheet material, each of which comprises a foot portion 496 shaped to accurately engage the inner face of member 493, and outwardly direct spacing loop or bead forming portion 497 and an inwardly directed weather strip receiving channel portion 498. Each strip intermediate loop portion 497 and channel portion 498 is provided with a screw head receiving openings which are conical shaped by pressing inwardly portions of the material as indicated at 499. Bifurcated members 501 are engaged with members 494 at intervals by engagement of the bifurcated portions with opposite sides of members 494 and thin tubular metallic spacing sleeves 502 are inserted between strips 495 with the inner or adjacent ends thereof resting in apertures in members 501 and engaged with opposite faces of member 494. The outer ends of said sleeves are engaged with and soldered or welded to strips 495 around screw head holes 499.

An internal screw 504 has the head thereof seated in and soldered to one of the holes 499 and an external screw 505 is threadedly engaged with each internal screw 504 and drawn up until the heads thereof engage holes 499 in the strip 495 on the opposite side of T-bar 493. Said screws are drawn up sufficiently to firmly pull strips 495 toward each other with the inner ends of spacing sleeves 502 in firm engagement with members 494. This construction provides a simple, yet strong, window frame arrangement.

Upper sashes 506 are each formed of strips of sheet material 507 each of which is bent transversely into loop formation and provided with a channel 508 for the reception of suitable packing and cushioning material such as rubber 509 in which the edges of glass panes 511 are secured.

Strip 507 has the opposite edges thereof brought into engagement and disposed against the outer face of the adjacent edge of member 493 and secured thereto by screws 512 which extend through member 493 and feet 496 of strips 495. One corner of the loop portion engages strip 495 adjacent loop 497. The upper sash 506 is thus immovably connected to body frame bars 431.

Lower sashes 513 are each formed of strips of sheet material 514 each of which is bent into substantial tubular formation as indicated at 515 and provided with a channel 516 for the reception of a packing strip 517 in which a corresponding edge of glass pane 518 is disposed.

Each member 514 engages one side of loop 497 and is held yieldingly thereagainst for sliding movement by means of a weather and guide strip 519 of any suitable material one edge of which is disposed in the continuous channel 498 and retained therein by screws 521 the inner ends of which are engaged in nuts 522 disposed between spacing members 502 and channels 498. Said nuts may be welded to the inner side of said channels.

A finishing strip 524 of thin sheet material and of U-shape in cross section is applied over the inner ends of members 501 and detachably secured thereto by screws 525. The opposite edges of strip 524 are in firm engagement with channels 498. As seen in Figure 27 a sill 526 of thin sheet material is provided for each lower sash comprising an inner outwardly projecting portion 527 in engagement with the inner edge of sash 513, and an outwardly and downwardly sloping portion 528 for efficient drainage and for engagement by a suitable packing 529 carried by the inner edge of sash 513. The portion 528 is continued in a portion 531 secured to the adjacent car body side by rivets 532. Covering 444 for the roof is extended in the form of a drip molding 533 above the upper window sash at each side of the body as clearly indicated in Figure 27 for deflecting the water collected on the roof away from the windows. This construction is more effective in preventing the dirt that may accumulate on the roof from being washed from the roof on the windows than gutters arranged over the windows so as to discharge the water to the sides of the windows, because the motion of the car throws the dirty water being discharged from such gutters against the window panes.

In Figures 58 to 64 inclusive, sheet #22 is illustrated a modiform of ventilating upper sash. In this form of the invention, each upper sash 506' comprises a rectangular frame formed of strips or rails 507' and 507" bent as shown and similar to strips 507 into loop formation providing channels 508'. As shown, rails 507' form the sides and top of each sash and rail 507" forms the bottom thereof. The frame is reinforced at the corners thereof by suitable reinforcing angle plates 509' preferably located within the rails 507' and 507".

Each sash 506' comprises a stationary section 511' and a slidable section 512' which sections are indicated of substantially equal size but may obviously be of unequal sizes.

The stationary section 511' comprises a light metallic frame constructed of strips or rails 513' (Figure 63, sheet #22) which as shown are of double rectangular formation comprising a channel engaging section 513$^a$ and a substantially wider section 513$^b$ for the reception of glazing rubber 514' in which the edges of a glass pane 515' are secured. The inner rail 513' extends vertically between rails 507' and 507" between the end rails 507' and is suitably secured to rails 507' and 507" by reinforcing plates 516'.

It will be noted upon inspection of Figures 59 and 60 that sections 513$^a$ of rails 513' occupy one half the width of channel 508' in rails 507' and 507" but occupying only about one half the full perimetric extent of said channel. Positioned in the channel 508' opposite slidable section 512' and occupying the half of channel 508' corresponding to that occupied by sections 513$^a$ is an anti-rattling member 518' composed of a thin metallic strip of U-section with the opposite ends thereof adjacent rail 513' of stationary sash 511' curved outwardly as indicated at 519'.

Slidably disposed in the other half of channel 508' are the sections 513$^a$ of rails 513' forming the frame for movable section 512' comprising a glass pane 521' having the edges thereof secured in glazing rubber 522' disposed in sections 513$^b$ of rails 513'.

One of the rails 513' of sash 512' or the one alined with frame 513' of fixed sash 511' in closed position as indicated in Figure 59 is provided with an extension 523' adapted to form a guide to prevent locking engagement of rails 513' of stationary and movable sections 511' and 512' upon sliding movement of section 512'. A suitable handle 525' in the form of an angle plate is secured to one of the rails 513' of sash 512' by means of which sash 512' can be easily slid in channel 508' to any desired extent of opening up to one half the width of sash 506' to effect ventilation of the body in a manner that will not cause objectionable drafts over the occupants of the body. When sash 512' is entirely opened the section 513$^a$ of rail 513' normally disposed centrally of sash 506' will engage channel 508' in the left rail 507' as viewed in Figure 59.

Rails 507' are provided with extensions 526' for attachment to bars 431 in a manner similar to that disclosed in Figure 28, sheet #15 and the lower rails 507" are unsecured having the edges of the material forming same bent into interlocking engagement as indicated at 527' in Figure 62 subsequent to the introduction of a wood filling strip 528' within the hollow in rail 507".

Secured to rail 507" by screws 529' is a plate 531' provided with inwardly curved flanges 532' on opposite edges thereof which confine a weather strip 533' for sealing engagement with the top of lower sash 513.

From the above disclosure it will be seen that sash 506' can be readily substituted for sash 506 providing a ventilating upper sash in which one half thereof is slidable past the other half, which is accomplished by employing thin brass channel rails in place of the rubber sealing strips 509 and 517 in sash 506.

By the provision of the two part upper sash as disclosed in which one part is slidable additional ventilation can readily be provided which will be admitted above the heads of seated passengers thus avoiding drafts with its attendant dangers. It will be understood that the whole lower sash is slidable so that in this form of the invention the body of the vehicle can be ventilated by selectively adjusting the lower sash, or the movable half of the upper sash, and the lower sash is adjustable in a direction that is normal to the direction in which the upper half-sash is adjusted. An extremely wide range of possible ventilating arrangement of the movable sashes is thus presented.

Arranged adjacent each end of the body at the same side thereof and outwardly of the front and rear wheels as indicated in Figure 50 (sheet 6) is a door 535 the front one of which may be an entrance door and the rear one an exit door.

In Figures 29, 30, 31, 32 and 33 (sheets 16 and 17) is illustrated the detail construction of the doors, as well as the mechanism for operating same. Each door 535 comprises a pair of like sections 536 each of which comprises a pair of sections 537 and 538. The latter sections are hingedly connected as indicated at 539 whereby sections 537 and 538 are adapted to fold as indicated in Figure 32 upon opening the door. Each section 537 and 538 comprises laterally disposed vertically extending frame members 541 and 542 the latter of which have their adjacent edges outwardly beveled as indicated in Figure 31 for positively avoiding injury to the hands or fingers of passengers upon closing the doors. The body portions of hinge members 544 are secured to said edges by screws 545 for forming the above noted hinge connection 539. Frame members 541 and 542 are connected intermediate their ends by short cross frame members 546 in slightly spaced relation. Said frame members 541 and 542 adjacent the upper ends thereof are connected by short vertically spaced cross frame members 547 while at the lower ends thereof said frame members are connected by short cross frame members 548 in substantial vertical spaced relation, from the cross members just described.

Frame members 541 and 542 of each section 537 and 538 as well as the contiguous cross frame members 546, 547 and 548 are recessed at their outer adjacent corners for the reception of glass packing means such as grooved rubber strips 549. Extending transversely of each section 537 and 538 and secured to members 541 and 542 as well as cross frame members 546, 547 and 548 are inner and outer panels 551, 552 and 553 respectively, the outer ones of which engage strips 549 and maintain them in their respective recesses. Glass panes 555 have their edges seated in the grooves of strips 549 of each section 537 and glass panes 556 have their edges seated in the grooves of each section 538, the panes 556 being preferably slightly narrower than panes 555 to permit the addition of flexible extensions 558 to the edges of the free doors. Said extensions are U-shape in cross section having the legs thereof secured to frame members 541 of adjacent sections 538 as indicated at 559 for yieldable line contact upon closing the doors in order to provide a close and air tight fit. Inner and outer panels 551, 552 and 553 of sections 537 are extended outwardly of frame members 541 and bent in cylindrical formation as indicated at 561 through which extend vertically disposed door operating shafts 562 to which members 561 are suitably secured.

Shafts 562 are suitably journaled at the lower ends thereof for rotation. At the upper ends thereof they extend through bearings 564 suitably supported adjacent the opposite ends of a wooden support 565, suitably secured to the frame over the door opening. A base 566 projects inwardly of support 565 and extends entirely across the space occupied by the doors in slightly vertically spaced relation to the top thereof as clearly indicated in Figure 30. Hingedly secured at 567 to a longitudinal member 568 at the edge of the roof is the outer edge of a vertically disposed wall 569 of a swingable housing having a horizontal or base portion 571 to the inner edge of which is secured a vertical extension 572 adapted for engagement by latches 573 for holding the housing in closed position as indicated in Figure 30 with base 571 of the housing in engagement with the projecting portion of base 566. Said housing covers the door operating mechanism presently to be described. It may be swung on its hinged connection to give access to said mechanism.

Secured to the outer end of one of the shafts 562 of each door by means of a nut 574 is a block 575 provided with a threaded aperture for reception of the threaded end of an eye bolt 576 which bolt is adjustable in an aperture in block 575 and locked in adjusted position by a lock nut 577. Extending through the eye of bolt 576 is a pintle 578 which also extends through alined apertures in the bifurcated angularly disposed end 579 of a rod 581, whose opposite end is threadedly engaged in the adjacent end of a bifurcated connector 582 and locked therein by a lock nut 583. Extensions 584 of connector 582 are pivotally connected by a pintle 585 to an extension 586 pivotally connected at right angles to pintle 585 to a double acting piston arranged in a pneumatic cylinder 587 which is connected through bracket 588 to base 566 before referred to. Pivotally secured to pintle 578 is the bifurcated end of a link 589 whose opposite end is provided with a threaded aperture for the reception of the adjacent threaded end 591 of an angular rod 592 which is locked in adjusted position by a lock nut 593. The opposite threaded end 594 of rod 592 is threaded into the adjacent end of a link 595 and locked therein by a lock nut 596. The opposite end of link 595 is pivotally secured to a pintle 597 carried by an eye 598 of an eye bolt 599, the shank of which is adjustably threaded in an aperture in a block 601 and locked therein by a lock nut 602. Block 601 is fixedly mounted on a vertically extending stub shaft 603 which also carries a toothed sector 604 in operative engagement with a sector 605 secured to the outer end of the other shaft 562 by a nut 606.

Secured to the inner surface of support 565 are the bases of a pair of L-section members 608 and 609 whose legs define a guide channel 611 for a roller 612 rotatably carried by a stud 613 one end of which is secured to a bracket 614, secured adjacent the outer edge of each door section 538. Secured to the same door sections at the bottoms thereof substantially in vertical alinement with rollers 612 are brackets 615 provided with arcuate guide flanges 616 (Figure 32) for cooperation with arcuate flanged guides 617, these members cooperating to draw the doors firmly against the frame at its lower end. Said members are secured to the underside of the body below the door sections (Figure 30). A yieldable packing 618 is supported from block 619 at the top of each door frame where the door sections overlap the frame and a similar packing 621 is supported from the frame at the bottom of each door frame where it is overlapped by the door sections.

A leaf spring member 622 has one end thereof secured to the leg of member 608 with the other or free end thereof adapted for yieldable bearing engagement with the edges of brackets 614 when the door sections are in closed position to prevent chatter or rattling thereof by firmly pressing the sections against the frame. In the operation of each door 535' movement is imparted to rod 581 by pneumatic action on piston in cylinder 587 and as rod 581 moves to the right as viewed in Figure 33 shafts 562 will, through the above described leverage connections, be rotated in directions indicated by the arrows in Figure 33 with the result that sections 537 of each door will be swung outwardly which through pivotal connections 539 with sections 538 will impart movement to the latter sections, and as sections 538 are guided by rollers 612 which move in a straight transverse direction, sections 538 will fold inwardly on sections 537 with extensions 558 adjacent shafts 562 in the full opened position of the door.

Upon closing the door, rod 581 is caused to move in the opposite direction by the piston in cylinder 587, the door sections 537 and 538 separate from each other toward a closing position as indicated in Figure 32 wherein it will be seen that as sections 538 approach their closed position flange 616 of each section 538 comes into guiding contact with the associated guide 617 such that when sections 538 reach their full closed positions flanges 616 and guides 617 will be in full interlocked contact. At this time the upper and lower edges of sections 538 will be in contact with packings 618 and 621 with the outer ends of sections 538 held in engagement with said packings 618 under the yieldable action of spring 622.

Upon swinging latches 573 out of engagement with extension 572, the housing defined by wall 569 and base 571 may be swung inwardly permitting access to the door operating mechanism above described as above stated. The flexible extensions 558 on door sections 538 cause a quiet closing of the doors as well as an air tight seal between the meeting edges of sections 538.

It will be noted upon inspection of Figure 50 that doors 535 are located substantially at the intersection of the side and end body sections 428 and 446 above referred to and each end section 446 is provided with suitable windows 624 affording proper vision for the operator at one end of the body.

As indicated in Figures 34 and 35 (sheets 8 and 18), each motor 172 with its associated radiator 176 is enclosed in a housing 626 and in order to utilize all available space within the body a side facing seat 627 is disposed over each housing 626. Similar seats 628 as indicated in Figure 46 (sheet 14) are disposed over the wheel housings 171, forwardly facing seats 629 occupying the remainder of the length of the body on either side of an uninterrupted central aisle 631 (Figure 46). Each motor housing 626 is preferably lined with heat insulating material in the form of panels or in flexible material. Suitable materials are asbestos cloth, "cellotex" or any other heat insulating material. Such material is applied to the inner face thereof in order to provide a good heat insulation between the motor compartment and the coach body.

The housing 626 for ach motor 172 is disposed opposite the detachable plate 483 through which cool air is admitted to the front of the radiator of each motor through louvers 484 and discharged through louvers 485.

As indicated in Figure 35, the radiators 176 are disposed in the forward ends of housings 626. In order to prevent the heated air from circulating around the radiators forwardly thereof within housings 626 resulting in such air becoming heated to a constantly increasing degree each radiator as indicated in Figures 9 and 10 (sheet 8) is provided with a shroud and baffle plate assembly comprising a shroud 633 disposed on the inner face of the cellular section of the radiator and provided with a fan encircling inner edge 634 of arcuate form from which it arches outwardly to the surface of the radiator. A baffle plate 635 extends across the front end of housing 626 in encircling relation to the radiator, the baffle plate 635 being secured to the top and opposite sides of housing 626.

By this arrangement, the cool air drawn in by fan 204 passes directly through louvers 484, housing 626, and out through louvers 485 thus effectively performing its function of properly cooling the motor, whereas if the air did not circulate directly through the housing but became trapped above the radiator it would continually become hotter thus seriously affecting the proper cooling of the motor.

As indicated in Figure 34 (sheet 8) the riser 641 of each housing 626 is provided with an inspection door 642 hinged at 643 and held in vertical closed position by means of a latch 644. The top of housing 626 behind seat 627 is provided with a door 645 for admitting heat generated by the motor and collected in the upper end of housing 626 into the body. The door 645 has associated therewith means for manually adjusting the opening thereof for regulating the heat supply from the housing into the body. Said means comprises a rod 646, one end of which projects through riser 641 and is provided with a knurled operating head 647. The opposite end of said rod is threaded and is rotatably mounted in apertures in spaced brackets 648 attached to the housing for swiveled rotational movement, the rod being retained against longitudinal movement by washers 649 engaging opposite faces of riser 641 with the inner washer maintained in such engagement by a coil spring 651 engaged therebetween and a stop 652 fixed on rod 646, to prevent rattling of said rod. Secured to the bottom of door 645 between the hinge 653 and the free edge thereof is a bracket 654 to which is pivotally secured one end of a lever 655 whose opposite end is pivotally secured to a nut 656 threadedly engaged with the threaded end of rod 646. In order to prevent the entrance of dust or other foreign matter into the body a basket-like screen 656' comprising several layers of thin mesh screen is suspended below the opening closed by door 645 and suitably secured in position.

It will accordingly be seen that upon rotating rod 646 through the head 647, nut 656 will move longitudinally of the rod resulting in door 645 opening to an extent depending upon the turning movement of head 647 thus regulating the amount of heat to the coach body. By the provision of the lined housing above described, the heat generated by the motor 172 will not be radiated from housing 626 with a consequent discomfort to passengers occupying seat 627 built over the housing.

In view of the fact that air within housings 626 is utilized for heating purposes entering the body through openings covered by doors 645, it is absolutely essential that neither exhaust gas fumes or crank case fumes be permitted to escape into the spaces within housings 626 from which they would enter with the heated air into the body. In order to avoid the leakage of exhaust gas fumes, which is most likely to occur at the connection of the exhaust pipe with the manifold, an exhaust pipe manifold-flange assembly is provided for each motor, one of which assemblies is illustrated in detail in Figure 36 (sheet 18) and wherein the outlet end of the exhaust manifold is provided with a flange 658 provided with a series of bolt receiving apertures 659. A plate 661 conforming in marginal contour with flange 658 is provided, said plate having a series of bolt receiving apertures 662 adapted to align with apertures 659. Plate 661 is provided with a central opening of the same diameter as the interior of the manifold within flange 658 and flange 658 and plate 661 are each provided with a recess 663 having an outwardly diverging marginal wall as indicated at 664, the recesses 663 of flange 658 and plate 661 being disposed in facing relation as indicated. In assembly, plate 661 is slid over the end of exhaust pipe 665 a suitable distance after which a soft brass ring 666 of isosceles triangular shape in cross section is slid over the end of exhaust pipe 665. The projecting end of exhaust pipe 665 is then inserted in the open end of the exhaust manifold such that ring 666 is disposed between flange 658 and plate 661 with the opposite edges thereof disposed in recesses 663.

As indicated in Figure 36 the outer angular faces of ring 666 are of less inclination than the marginal walls of recesses 663 leaving an appreciable circular channel adjacent each outer face of ring 666.

Alined apertures 659 and 662 are adapted to receive clamping bolts for drawing plate 661 toward flange 658 resulting in lateral compression of ring 666 whereby the material of ring 666 will be tightly compressed into recesses 663 and upset against the outer surface of exhaust pipe 665 producing a gas tight joint thus avoiding all possibility of the escape of exhaust gases into the motor housing 626.

In order to prevent the egress of crank case fumes into the coach body from housings 626 as well as to provide effective means for warming and cleaning the air drawn into the carburetor, a crank case breather and air intake filter assembly is associated with each motor 172 as illustrated in detail in Figures 37 and 38 (sheet 18) wherein it will be seen that each motor 172 is provided with an air intake breather 671 suitably secured to the engine housing and in communication with the oil chamber or crank case. Motor 172 is provided with a crank case breather pipe 672 which may be of any well known form and air intake breather 671 and crank case breather pipe 672 are disposed on opposite sides of the motor crank case as illustrated in said figures.

The carburetor 673 which is located on the same side of motor 172 as air-intake breather 671 has associated therewith an air cleaner 675 which comprises an outer casing or shell 676 to the outer end of which is secured a casting 677 having an inlet connection 678 and an outlet nozzle connection 679

Detachably secured to the bottom of casting 677 between vertically spaced centrally apertured marginal flanged discs 681 is a cylindrical wool filter member 682 within the central bore of which is disposed a cylindrical screen 683. Engaged with the lower end of screen 683 is a cup washer 684 in which is secured by means of a cotter or similar means the inner end of a vertically disposed clamping bolt 685 whose outer end extends through casting 677 and has a nut 686 engaged with the outer end thereof in engagement with a closure disk 687 for an oil chamber 688 in casting 677. A cover 689 is provided for charging oil into chamber 688. The bottom of shell 676 is provided with a removable cap 691 for the removal of sediment collected from the air passing through the cleaner. The nozzle connection 679 at the inner end thereof is in communication with the outer end of screen 683 and at the outer end thereof is detachably secured to the carburetor 673.

Detachably secured to connection 678 is one end of an air intake connection 692 which at the other or outer end thereof is provided with a rearwardly opening breather horn 693 and secured to and in communication with connection 692 adjacent the bottom of horn 693 is one end of a pipe connection 694 whose opposite end is connected to the crank case breather pipe 672. In the operation of the construction just described, air is drawn into intake breather 671, through the crank case and thence out through crank case breather pipe 672, connection 694 and into cleaner 675 through intake connection 692, thus avoiding the admission of crank case fumes into housing 626. Air is drawn by the carburetor 673 into horn 693 and thence through cleaner 675.

The air in passing through cleaner 675 passes through filter member 682 and screen 683 by means of which the air is entirely deprived of dirt before entering the carburetor. As the air passes through cleaner 675, oil from chamber 688 drops slowly and continuously thus carrying the dirt collected from the air to the bottom of shell 676 from which it can be periodically removed upon removal of cap 691.

It will be seen that by the provision of the crank case breather and air intake filter construction described the air within housings 626 is maintained in a pure condition permitting the use thereof for body heating purposes and furthermore the air drawn into the carburetor is freed of all foreign matter thus greatly lessening the possibilities of carburetor trouble.

In Figures 65, 66 and 67, sheet #21 is disclosed a modification of the crank case breather and air filter construction above disclosed wherein the pipe connection 694 is connected directly on the intake end of the cleaner 675 as indicated at 694′.

In this form of the invention the air intake connection 692 is replaced by an air intake member 692′ in the form of a conical baffle and comprising a cylindrical member 694$^a$ provided with a flange 694$^b$ for detachable connection with the inlet connection 678 of air cleaner 675 and a conical baffle head 694$^c$ of considerably larger diameter than member 694$^a$ and opening toward the inlet end of member 694$^a$ and secured thereto by thin metallic straps 694$^d$ spot welded to member 694$^a$ and head 694$^c$. In accordance with this form of the invention air is drawn by the carburetor 673 into the rearwardly facing open end of conical head 694$^c$ in the same manner in which it is drawn into horn 693 in the first form of the invention.

The operation in accordance with this form of the invention is substantially the same as in the first form of the invention but in this form of the invention the air passing through the radiator will not be restricted due to the low position of member 692′ and furthermore the construction in accordance with this form of the invention is somewhat cheaper of construction than that made in accordance with the form of the invention first described.

In Figures 39 and 40 (sheet 10) is disclosed a heating arrangement, which may be used with the engine heating system above described or independently thereof.

As indicated in these figures the floor 486 is provided with a rectangular opening 696 at a point above mufflers 372 and opening 696 is provided with a marginal inset flange 697. Resting upon and suitably secured to flange 697 is the horizontal flange 698 of a hot air register 699 comprising, besides flange 698 a vertical marginal flange 701, integral with flange 698. A suitable shutter arrangement may be provided within the flange 701 for regulating the flow of heated air into the coach body.

Secured by means of rivets 702 to the outer face of flange 701 is the outer end of an inner casing 703 the opposite sides of which converge inwardly as at 704 and thence vertically at 705 between the mufflers 372. The base of casing 703 is pressed outwardly defining an inwardly opening substantially wide channel 706 and an outwardly opening narrow channel 707 at each side of channel 706, the vertical walls 708 defining the sides of channel 706 being perforated for establishing communication between channels 706 and 707.

Surrounding casing 703 as well as the major portions of mufflers 372 is an outer casing 711 having its outer end in lapping engagement with casing 703 and also secured to flange 701 by the rivets 702. The mufflers 372 extend through conforming apertures in opposite walls of casing 711. The opposite walls of casing 703 have the ends thereof connected in gas tight relation to said opposite walls of casing 711.

Casing 711 extends entirely around mufflers 372 in a lateral direction and the opposite lateral walls of said casing are held in spaced relation to mufflers 372 by means of spacers 712, with the base or bottom of casing 711 in engagement with the bottom of casing 703 defining the bottoms of channels 707.

The bottom of casing 711 is provided with a series of longitudinally spaced apertures 713 establishing communication between channel 706 and the atmosphere. Guide bars 714 are secured to casing 711 at each side of the longitudinal series of apertures 713.

Slidably disposed between bars 714 and guided thereby are the opposite edges of a slide plate 715 provided with a longitudinal series of spaced apertures 717 of the same spacing as apertures 713 the arrangement being such that the two series of apertures will align in one position of slide plate 715. Plate 715 is provided with an actuating end extension 718 provided with a hole 719 for attachment of a suitable rod or lever for actuation of slide plate 715 from a position within the coach body.

In operation of the heating arrangement just described, fresh air enters channel 706 through registering or partially registering apertures 713 and 717 and passes from channel 706 through the perforations in walls 708, into channels 707 and thence outward adjacent the side walls of inner casing 703, which are heated by the mufflers 372. The air is heated by the walls of said casing prior to passing into the coach body, without contacting with the muffler.

By regulating the slide plate 715 apertures 713 and 717 can be lapped to any desired extent for controlling the flow of fresh air into channel 706 and by means of a suitable shutter arrangement disposed within flange 701 forming part of the air register the volume of heated air entering the car body can be easily regulated to suit the comfort of passengers being transported. By the provision of the inner and outer casings, the mufflers 372 are entirely housed from the space within inner casing 703, this arrangement preventing the ingress of exhaust fumes to the coach body should one or both mufflers spring a leak. Accordingly the heat radiated by the confined portions of the mufflers is confined between the inner and outer casings which will heat the opposite walls of inner casing 703 for effectively heating the air admitted through apertures 713 and 717.

In the utilization of both the engine and exhaust gas heating arrangements hereinbefore described, the heat therefrom is confined mainly to the rear portion of the body with the result that the front portion of the body may be uncomfortable for lack of proper heating thereof.

In order to obviate this unequal distribution of heat throughout the length of the coach body an arrangement that will function to heat the front end of the body may be provided. Such an arrangement is illustrated in detail in Figures 41, 42, 43 and 44 (sheet 19).

As disclosed in these figures, mufflers 372' are used. Each of said mufflers is of frusto-conical formation with the smaller end thereof substantially equal in diameter to the exhaust pipe 371 communicating therewith and the larger end is of a diameter substantially exceeding that of exhaust pipe 371. The muffler 372' is provided with perforations 721 in the wall thereof and throughout the longitudinal extent thereof, and is surrounded by a casing 722 comprising inner and outer spaced cylindrical walls 723 and 724 with the inner wall 723 in spaced relation with muffler 372'. Casing 722 is provided with end walls 725 defining an inner chamber 726 surrounding muffler 372' and in communication therewith through perforations 721, and a gas tight outer chamber 727 surrounding chamber 726.

Casings 722 are interconnected adjacent the forward ends thereof by a branch connected member 728 comprising lateral conduits 729 in communication with chambers 727 and a vertical enlarged frusto-conical casing member 731 in the mouth of which is suitably journaled a fan 732. The mouth of casing member 731 is adapted for projection into an aperture 733 in floor 486 as indicated in Figure 43.

Projecting from each casing 722 adjacent the opposite end thereof and integral therewith is a tubular extension 735 adapted for projection into an aperture 736 in the floor 486.

Resting upon floor 486 and longitudinally disposed thereon is a casing 737 provided with base securing flanges 738 and a pair of laterally spaced partitions 739 defining with the outer wall of casing 737 a central air tunnel 741 and an air tunnel 742 on each side of tunnel 741.

Casing 737 and likewise tunnels 741 and 742 extend from the rear ends of casings 722 to within a short distance of the front end of the body as is clearly illustrated in Figures 41 and 42.

The forward end of casing 737 is open thus putting the corresponding ends of air tunnels 741 and 742 in communication with the interior of the coach body and the rear ends of the tunnels are closed with the closure of tunnel 741 disposed closely to the rear of fan 732 and the casing member 731 communicating with the rear end of tunnel 741 and extensions 735 communicating with the rear ends of tunnels 742.

In operation of the construction above described, fan 732 is set into operation by any suitable electrical connection which draws cold air from the front of the body adjacent the floor thereof rearwardly through the air tunnel 741 and forces it through conduits 729 into the forward ends of chambers 727 where it is substantially heated through contact with walls 723 in turn heated by the exhaust gases passing through perforations 721 into chamber 726, which chamber with muffler 372' forms a combined muffler and heating assembly. The heated air passes rearwardly through chambers 727 and out through extensions 735 into the rear ends of air tunnels 742 and thence forwardly therethrough into the car body from the open forward ends thereof, the movement of the air through the tunnels 742 being accelerated by the action of fan 732.

By this arrangement, not only is the car body efficiently heated, but ventilators 471 and 472 and the roof ventilators 746 disposed over suitable roof openings, as shown in Figure 50, provide an effective ventilating arrangement, to supply fresh air which is taken from the forward end of the car and heated and returned to said end.

As also indicated in said figure, the ventilators 746 are preferably in the form of air scoops vertically pivoted at the centers thereof whereby they may be swung to face forwardly or rearwardly as indicated by full and dotted lines in order to effectively regulate the ventilation of the body.

As indicated in Figures 45 and 46 (sheets 14 and 15) a baggage rack construction is provided at each side of the body adjacent the roof thereof. The construction of one of said racks is illustrated in detail in Figure 45. Wherein it will be seen that one edge of the rack is applied beside the longitudinally extending roof edge securing strip 568, and that the other edge is secured to another spaced longitudinally extending strip 748, suitably secured adjacent the top of the body sides. A transversely curved sheet aluminum lining plate 749 serves to line the portion of the body between longitudinal members 568 and 748, an intermediate portion engaging and being secured to strip 747. The outer lower edge of the lining, it may be noted, is bent outwardly for engagement with two adjacent sides of strip 748 and suitably secured thereto.

The lining plate 749 serves the double function of providing a back wall for the baggage rack, as well as a neat interior finish for the body.

Resting against the inner surface of plate 749 adjacent the inner edge thereof are the feet 751 of brackets 752 which feet are secured to plate 749 and strip 568 as indicated.

Brackets 752 comprise curved portions 753 adapted for association with alined curved seating members for the reception and retention of a hand grip rail in the well known manner.

When employing the baggage rack construction the hand grip rail is omitted and the outer end of a curved rack bar 755 is secured to each bracket 752 as indicated at 756, each rack bar comprising a vertical portion 757, and a horizontal portion 758 integrally united with the vertical portion by a curved portion 759. The outer end of each bar 755 is slightly outwardly curved and provided with a terminal attaching foot 761 engaged with the frame under strip 748 and secured to the adjacent window finishing strip 524 as indicated at 762.

Removably supported on the horizontal portions 758 of rack bars 755 are the ends of sheet metal supporting plates 763 with rear portions thereof extending upwardly into lapping engagement with plate 749 as indicated at 763' and with the forward edges thereof provided with beads 764 presenting a nonobstructing guiding edge for the placing or removing of baggage and further presenting a convenient shoulder rest for standing passengers. Each supporting plate 763 is provided with a suitable fabric lining upon which the baggage is adapted to rest without any attendant marring thereof.

As will be seen from an inspection of Figure 46 the baggage racks are so arranged that the baggage supports formed by metal members 763 are so disposed as to provide sufficient space for the loading and unloading of baggage and the baggage carrying spaces are of substantial capacity, thus making provision for the transportation of a comparatively large amount of baggage without encroaching upon the seat and aisle space necessary for the comfort of passengers. Furthermore the beaded support is for passengers to lean against.

In the event that one or both of the baggage racks are not required, bars 755 are removed and the commonly used hand grip rails may be quickly and easily assembled with the brackets 752.

Due to the sectional construction of the racks by providing removable supports 763, the opposite ends of which rest upon and are detachably secured to bars 755 any number thereof may be readily removed when not required in which event a hand grip rail 760 may be readily secured to brackets 752 above the space from which the support was removed as indicated in Figure 46, sheet #14. Thus by the provision of the sectional baggage rack little labor is required to equip the body with just sufficient baggage carrying space leaving the remainder of the body free for standing passengers to grip rail 760.

Coaches of the character herein disclosed are frequently employed for long distance transportation and are accordingly preferably provided with lavatories for the convenience and comfort of passengers being transported.

In Figures 47, 48 and 49 (sheet 20) is illustrated the detailed construction of a preferred form of lavatory for coaches of the character embodied in this application.

As indicated in these figures a compartment 771 is provided in one corner of the coach body at the rear end thereof, the compartment being formed by a side vertical wall 772, a front vertical wall 773, a rearwardly extending vertical wall 774 continuous with wall 773, a transversely disposed narrow vertical wall 775 connecting the rear edge of wall 774 with the adjacent side of the coach body, a door 776 hinged at 777 to the inner edge of wall 773 and comprising a pair of sections 778 hingedly connected at 779 with the inner edge of the inner section 778 adapted for engagement with the adjacent edge of wall 772, which is provided with a suitable flexible lap strip 781 together with the adjacent portions of the body side and end, as clearly indicated in Figure 49.

As indicated in Figure 47 a ventilater 782 is provided on the roof above compartment 771. Walls 774 and 775 together with the adjacent side of the body define a channel 783. Wall 774 is provided with ventilating louvers 784 whereby compartment 771 is effectively ventilated by means of a circulating of air into channel 783 through louvers 784 and ventilator 782. A water supply tank 786 is secured by means of a suitable strap 787 adjacent the coach roof and is provided with a filler pipe 788 and an overflow pipe 789 both of which are in communication with the top of the tank. Filler pipe 788 is provided with a suitable hose connection 791 accessible from the outside of the body. Overflow pipe 789 extends through the floor 486 as indicated at 792 to discharge outside the car body. A pipe line is in communication at the upper end thereof with one end of tank 786 adjacent the bottom thereof and is provided with a valve 794. The lower end of pipe 793 is in communication with a bowl 795 which is provided with a septic tank 796 having a trap door 797 in the bottom thereof and which is operated through a lever 798. Pipe 793 adjacent bowl 795 is provided with a T-connector to the central branch of which one end of a pipe 799 is connected and the other end of pipe 799 is in communication through a T-connector 801 with a pipe 802 the upper end of which is in communication with a lavatory 803 and is provided with a flow regulating valve 804 adjacent lavatory 803. Communicating with the bottom of lavatory 803 is the outer end of a drain pipe 805 whose inner end extends through floor 486 as indicated at 806. The lower end of pipe 802 is in communication with one end of a spiral conduit 808 whose opposite end is connected with the adjacent end of a second spiral conduit 809 in communication with whose opposite end is the inner end of a pipe 811 whose outer end is in communication with a drinking fountain 812. Conduits 808 and 809 are disposed in an ice box 813 adapted to contain ice insertable into the box through a door in the adjacent side of the body as indicated at 814. The bottom of box 813 is provided with a valve controlled water drain plug 815. A suitable drinking cup container 816 is provided adjacent fountain 812 and a suitable electric fan 817 and a light 818 are provided in compartment 771.

From the foregoing description it will be seen that a toilet is provided comprising all of the conveniences enjoyed in stationary toilets by the utilization of a comparatively small part of the space in the car body and by the provision of ventilators 782 and 784 a circulation of air in the toilet will be maintained through compartments 771 from ventilator 784 and out through ventilator 782 thus avoiding any possible chance of objectionable odors entering the car body proper.

It will be seen from the foregoing disclosure that while the chassis supported elements are all concealed within the body sides and ends projecting below the floor 486, all parts necessitating external communication as the radiators, gas tank, lavatory supply tank etc. are readily accessible through suitable connections externally of the body. Due to the concealment of motors 172 provision is made for manual starting or cranking thereof, as illustrated in Figure 37 (sheet 18). The means for this purpose, preferably, comprises a laterally extending rod 821 longitudinally movable in suitable apertures in bosses 822 and 823 and provided with a suitable outer end 824 designed to receive a removable crank. Said end extends through an opening in the coach body side. On the inner end thereof a pinion 825, normally held out of operative engagement with pinion 826 on the engine crank shaft by a coil spring 827 surrounding said 82 is provided. Said spring bears at one end thereof against boss 822 and at the opposite end thereof against a washer 828 fixed to shaft 821 that normally contacts with boss 823.

When it is desired to crank the motor, a suitable crank is engaged with the outer end 824 of rod 821 and pressure applied longitudinally of rod 821 compressing spring 827 between boss 822 and washer 828 and bringing pinion 825 into meshing engagement with pinion 826, whereupon rod 821 is rotated, which, through pinions 825 and 826, imparts rotation to the crank shaft for starting the motor. When the motor starts pinion 825 will be retracted by the yieldable effort of spring 827.

By the provision of the motor cranking arrangement disclosed the motors can be conveniently started from the sides of the body. While pinions 825 and 826 need not necessarily be of the relative sizes indicated, and may even be of the same size, it is preferable to make pinion 825 considerably smaller than pinion 826 as indicated thus making the motors much easier to crank. With relatively large motors, this is a desirable feature even though it is necessary to make several crank revolutions to turn the motors over.

While the teeth of pinions 825 and 826 may be of the ordinary bevel gear type, it is preferable to construct the teeth such that they will present interengaging shoulders for turning the motor crank shafts to start the motors, and provided with inclined camming surfaces leading to the shoulders whereby upon reverse rotation of the motor crank shafts occasioned by back firing or otherwise the pinions 825 will be thrown from meshing engagement with the pinions 826 thereby removing any danger of personal injury to a person engaged in the cranking operation. The probabilities of disengagement of the gears is materially increased because only a few of the teeth on the respective gears are in engagement at one time.

It will be seen from the foregoing disclosure that a coach construction, capable of expeditious assembly by the method above set forth is provided. Moreover, because of the fact that the body is built up of units that have previously been constructed a superior construction is produced because the units can be more satisfactorily assembled and fabricated, thus contributing to the perfection of construction of the units as well as the construction considered as a whole. By providing the dollies 39 axles are conveniently assembled with respect to the base frame construction, because the dollies prevent rotation of the axle assemblies about their longitudinal axes, so that said assemblies may simply be rolled in position beneath the frame and secured thereto. The frame constituting the body base, as well as the side and end units are constructed around templates facilitating manufacture and insuring accuracy, that will permit the rapid assembly of the units to form the completed coach. The body itself serves to support the driving units of the coach avoiding the use of heavy chassis construction. This is possible because the box-like character of the body results in a trussed structure, the upper portions of the body serving to strengthen the base frame. Relatively light structural members may accordingly be employed. Such members can also be utilized because, in view of the disposition of the motors and drive mechanism a construction is provided that is balanced with respect to a central longitudinal line as well as wth respect to a central transverse line through the body base frame.

It will of course be understood that the number of assembling stations and the operations carried out by each may be varied, the main consideration being that the coaches be constructed in units each constituting a substantial part of the body and that the vehicle be built upon by assembling relatively few of such units.

Further importance in the utilization of dollies 39 comprising the swivel castors 41, lies in the fact that they permit forward, sideward or angular movements of the constructions thus making it an easy matter to move the partially assembled constructions from one station to another, which as is well understood, are located at various positions which would be difficult to reach if the housings were initially provided with the road engaging wheels due to the fact that the constructions which are of relatively great length could not be easily and quickly moved to a laterally disposed position by turning same through steering movement of the front wheels.

With the dollies, the incompleted constructions can be moved as easily in one direction as another whereby they can be moved not only from one station to another but can be readily shifted to clear any obstruction that may present itself in the course of the carrying out of the various operations. The advantages of the dollies are readily manifest upon consideration of Figure 17, representing the body assembling station and wherein a body side member is being lowered into position. While the final position can be fairly accurately determined upon lowering the sides such sides may not fall to their correct position due to mis-alinement thereof with the chassis which can be readily corrected by imparting slight movement of the chassis in any direction readily permitted by dollies 39.

The body being constructed as hereinbefore set forth is relatively light, strong and by the provision of the covering 433 comprising the outer metallic layers 434 and interposed wood layers 435 is well insulated against heat exchange. The covering of the construction disclosed further possesses a most desirable characteristic in that any portion thereof upon encountering an obstruction as in collision will readily yield to the impact of such collision and will bend rather than readily break thus greatly reducing the transmission of such impact throughout the body with the consequent less liability of injury to passengers.

By the provision of the propeller shaft brake equalizing means and carburetor control means the operation of the two oppositely disposed motors is equally effected for causing uniform operation of the propeller shafts operatively connected with the rear drive wheels.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What I claim and wish to secure by U. S. Letters Patent is:

1. A method of constructing and assembling motor vehicles, comprising the formation of a relatively light base frame supporting structure by shaping relatively light structural members to conform to a template; welding said members together while supported and positioned by said template; assembling said base frame supporting structure on additional longitudinally disposed frame members positioned by a second template; and securing said base frame supporting structure to said additional frame members; said second template accurately positioning said base frame supporting structure and said additional frame members relative to each other.

2. A method of constructing and assembling motor vehicles, comprising the formation of a base frame construction constituting the bottom of the body frame; bringing front and rear assembled spring and axle constructions into proper position beneath said base frame construction through the instrumentality of transporting dollies each including a plurality of wheels on which said spring and axle constructions are individually non-rotatively supported, securing said spring and axle constructions to said base frame construction; and transporting said base frame construction on said dollies to succeeding assembling stations.

3. A method of constructing and assembling motor vehicles, comprising the formation of a relatively light base frame structure constituting the bottom of the body frame; connecting assembled spring and axle constructions individually non-rotatively supported by transporting dollies each including a plurality of wheels with said base frame structure; assembling the power and control mechanism with said base frame structure; then separately forming body side and end members; transporting said base frame structure by means of said dollies to a succeeding assembling station; assembling said side and end members with said base frame structure.

4. A method of constructing an assembling motor vehicles, comprising the successive formation of base frame supporting structures on shaping and supporting templates located at successive assembling stations; successively suspending said base frame supporting structures at a succeeding assembling station; connecting assembled spring and axle constructions individually supported on transporting dollies with said base frame supporting structures while in said suspended position; assembling the power and control mechanism with said base frame supporting structures; separately constructing side and end body members; manually transporting said base frame supporting structure by said dollies to a succeeding assembling station; assembling side and end members with said base frame supporting structures; assembling a roof with said side and end members; and manually transporting said base frame supporting structures with the bodies assembled therewith by said dollies to succeeding assembling stations for the assembly of doors, windows, and other parts.

5. The method of fabricating a bus body which consists in individually separately constructing a substantial portion of the sides, end and roof of the body including the frame members thereof each as a unit constructed about templates accurately positioning the component parts of the units with respect to each other, and in which said component parts of each unit are permanently secured together while the unit is in position on its template, and in then assembling the units thus formed and securing them together to form the completed vehicle body.

6. The method of constructing an automotive passenger carrying vehicle which consists in forming the base of the body of the vehicle about a template designed to accurately locate the component parts of said base frame and to facilitate their attachment to each other, constructing substantial portions of the sides, ends, and roof of the body including the frame members thereof individually as separate units about templates designed to facilitate the location and the attachment of the component parts of said portions, and then completing the formation of the body by securing together said portions of said sides, ends and roof, and said base frame by a template arranged to locate and facilitate the securing together of said frame and units.

7. The method of constructing the body of a passenger-carrying bus including window and door openings in the body, which consists in fabricating as units a substantial part of the sides and of the ends of the body about templates arranged to accurately position the frame members surrounding said openings and entering into said units with respect to each other and to facilitate securing them together, constructing the roof of the body in units each constituting a substantial part of the whole roof about templates designed to position the frame members of the roof and to facilitate securing them together, and then assembling the relatively few units thus provided to form the body.

8. The method of constructing the body of a passenger-carrying bus including window and door openings in the body, which consists in fabricating substantial portions of the base, the sides, the ends and the roof including the frame members thereof as separate units about templates designed to facilitate the accurate location of the frame members of said units surrounding said openings and to enable said members to be expeditiously secured together, and then securing the relatively few units together to form the complete body skeleton.

9. In a motor vehicle construction, the method of shaping and assembling structural frame members which form a relatively light base frame for the vehicle, which comprises bending a plurality of relatively light frame members around a base frame template to cause them to conform to the shape of the template, and welding said members together while supported and assembled around said template.

10. In a motor vehicle construction, the method of accurately and rapidly shaping and assembling the vehicle frame members to facilitate quantity production of vehicles, which comprises providing a rigid shaping and positioning template, shaping a plurality of vehicle frame members accurately around said template, temporarily supporting said members in assembled relation on said template, and rigidly uniting said members together while properly positioned by said template.

11. In a motor vehicle construction, the method of accurately and rapidly shaping and assembling the vehicle frame members to facilitate quantity production of vehicles, which comprises providing a plurality of templates corresponding in shape to various portions of the vehicle, shaping a plurality of vehicle frame members around each template, rigidly uniting the frame members together while assembled on said template, assembling the groups of frame members thus united, and permanently securing together the groups of frame members.

12. In a motor vehicle construction, the method of accurately and rapidly shaping and assembling the vehicle frame members to facilitate quantity production which comprises providing a plurality of templates corresponding in shape to various parts of the vehicle, shaping a plurality of vehicle frame members around each template, rigidly uniting the frame members together while assembled around each template, assembling the groups of frame members thus united around a template to accurately position each group of frame members with respect to the other groups, and rigidly uniting the groups thus assembled.

13. In a motor vehicle construction, the method of accurately and rapidly shaping and assembling the vehicle base frame and body members to facilitate quantity production, which comprises shaping the base frame members of the vehicle around a base frame template, rigidly uniting the base frame members together while assembled around the template, shaping the body frame members around body templates, rigidly uniting said body frame members together while assembled around the body templates, assembling the base frame and body frame thus formed, and permanently uniting the same.

14. In a motor vehicle construction, the method of accurately and rapidly shaping and assembling the vehicle base frame and body members to facilitate quantity production, which comprises shaping the base frame members around a base frame template, rigidly uniting the base frame members while assembled around said template, forming a plurality of vehicle body sections by shaping body frame members around a plurality of body templates, rigidly uniting each group of body frame members together while assembled around its template, assembling the plurality of body sections on the base frame, and rigidly uniting the assembled body sections together and to the base frame.

15. A method of constructing and assembling motor vehicles, comprising the formation of a base frame structure by shaping a plurality of base frame members around a base frame template, rigidly securing said members together while supported and assembled on said template, assembling the base frame structure thus formed on additional frame members positioned on and supported by a second template, and securing said base frame supporting structure to the additional frame members while the parts are assembled on said second template, the second template accurately positioning said base frame supporting structure and said additional frame members relative to each other.

16. In a motor vehicle construction, the method of constructing and assembling an automotive bus body which comprises forming a plurality of body sections by shaping body frame members around a plurality of body templates, permanently and rigidly uniting each group of body frame members while on its template, and assembling and uniting the body sections thus formed.

17. In a motor vehicle construction, the method of constructing and assembling a body which comprises forming as separate units a base frame, sides, and ends of the body, said units being formed of structural members shaped around templates and rigidly secured together while positioned on the templates, and assembling and uniting the separate units thus formed.

In testimony whereof I affix my signature.

WILLIAM B. FAGEOL.